US007467273B2

(12) United States Patent
Ishida et al.

(10) Patent No.: US 7,467,273 B2
(45) Date of Patent: Dec. 16, 2008

(54) STORAGE APPARATUS FOR PREVENTING FALSIFICATION OF DATA

(75) Inventors: Manabu Ishida, Yokohama (JP); Yohsuke Ishii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 433 days.

(21) Appl. No.: 11/362,088

(22) Filed: Feb. 27, 2006

(65) Prior Publication Data

US 2007/0156988 A1 Jul. 5, 2007

(30) Foreign Application Priority Data

Jan. 4, 2006 (JP) ............................. 2006-000030

(51) Int. Cl.
*G06F 12/00* (2006.01)
(52) U.S. Cl. .......................................... 711/163; 707/9
(58) Field of Classification Search .................. 711/163
See application file for complete search history.

(56) References Cited

U.S. PATENT DOCUMENTS

| 6,493,804 | B1* | 12/2002 | Soltis et al. ................. 711/152 |
| 7,171,434 | B2* | 1/2007 | Ibrahim et al. .............. 707/204 |
| 2004/0186858 | A1 | 9/2004 | McGovern et al. |
| 2004/0193827 | A1* | 9/2004 | Mogi et al. ................. 711/170 |
| 2005/0097289 | A1* | 5/2005 | Burton et al. ............... 711/162 |
| 2007/0198710 | A1* | 8/2007 | Gopalakrishnan ........... 709/225 |

OTHER PUBLICATIONS

Apple: "Mac OS X Server File Services Administration, for version 10.3 or Later", MAC OS X Server Manuals [Online] Dec. 31, 2005, pp. 1-103.
Sun Microsystems: "NFS Administration Guide", Sunsoft NFS Documentation [Online], Aug. 1994, pp. 1-86.
(No Author Name Supplied in Source Data), "Method to Improve Security and Manageability of NFS (Network File System) Export Lists", IP.COM Journal, Jul. 23, 2004, pp. 1-4.

* cited by examiner

*Primary Examiner*—Kevin L Ellis
*Assistant Examiner*—Hashem Farrokh
(74) *Attorney, Agent, or Firm*—Mattingly, Stanger, Malur & Brundidge, P.C.

(57) ABSTRACT

When a file server is to create data that does not permit falsification in an external storage, it is not possible to guarantee that the rewriting of this data can be prevented from a computer connected to the external storage without going through a file server. Provided is a storage system configured from a first storage having a file I/O processing unit and a second storage connected to this first storage, wherein the first storage includes a unit for requesting a change of access authority to the storage area in the own storage and in the second storage provided to the own storage. An access request to a storage area in a second storage from a computer connected to a second storage without going through a file I/O processing unit is restricted based on the change of access authority executed by the second storage upon receiving the request from the first storage.

18 Claims, 21 Drawing Sheets

FIG.2

| VIRTUAL LOGICAL VOLUME NUMBER 201 | STORAGE NAME: LOGICAL VOLUME NUMBER IN STORAGE 202 | WORM ATTRIBUTE 203 | |
|---|---|---|---|
| 1 | STORAGE 120:1 | No | 210 |
| 2 | STORAGE 120:2 | No | 211 |
| 3 | STORAGE 120:3 | No | 212 |
| 4 | STORAGE 130:1 | No | 213 |

| STORAGE NAME 301 | SECURITY CONFIGURATION FLAG 302 | |
|---|---|---|
| STORAGE 120 | Yes | 310 |
| STORAGE 130 | Yes | 311 |

| LOGICAL VOLUME NUMBER 401 | I/O PROCESSING UNIT NAME 402 | ACCESSIBILITY ATTRIBUTE 403 | |
|---|---|---|---|
| 1 | FILE I/O PROCESSING UNIT 140 | R/W | 410 |
| 1 | FILE I/O PROCESSING UNIT 161 | R/W | 411 |
| 2 | FILE I/O PROCESSING UNIT 150 | R/W | 412 |
| 3 | FILE I/O PROCESSING UNIT 160 | R | 413 |

185

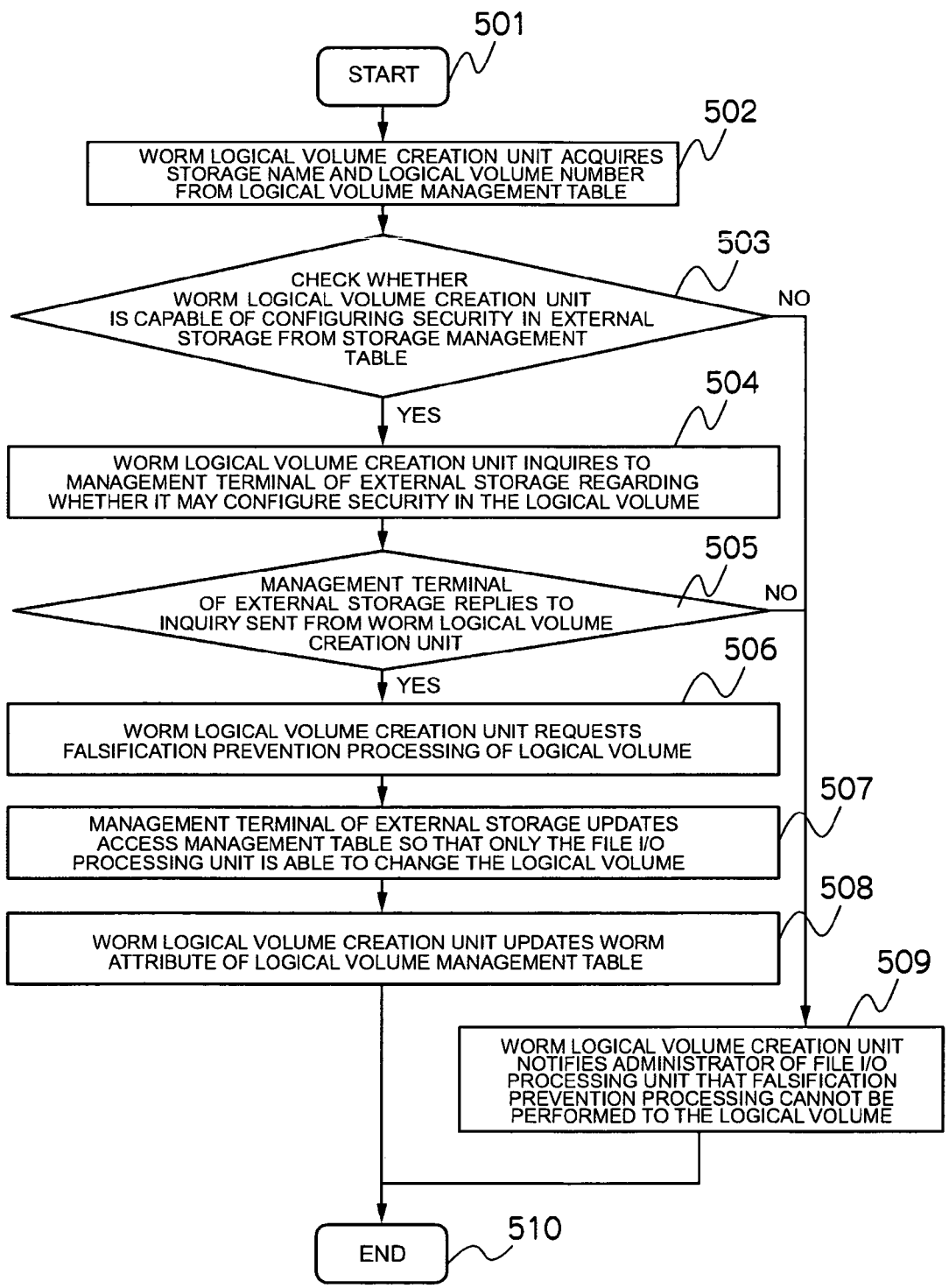

FIG.6

| LOGICAL VOLUME NUMBER 401 | I/O PROCESSING UNIT NAME 402 | ACCESSIBILITY ATTRIBUTE 403 | |
|---|---|---|---|
| 1 | FILE I/O PROCESSING UNIT 140 | R/W | 410 |
| 1 | FILE I/O PROCESSING UNIT 161 | R | 600 |
| 2 | FILE I/O PROCESSING UNIT 150 | R/W | 412 |
| 3 | FILE I/O PROCESSING UNIT 160 | R | 413 |

| VIRTUAL LOGICAL VOLUME NUMBER 201 | STORAGE NAME: LOGICAL VOLUME NUMBER IN STORAGE 202 | WORM ATTRIBUTE 203 | |
|---|---|---|---|
| 1 | STORAGE 120:1 | No | 210 |
| 2 | STORAGE 120:2 | No | 211 |
| 3 | STORAGE 120:3 | No | 212 |
| 4 | STORAGE 130:1 | Yes | 700 |

| LOGICAL VOLUME NUMBER (401) | I/O PROCESSING UNIT NAME (402) | ACCESSIBILITY ATTRIBUTE (403) | |
|---|---|---|---|
| 1 | FILE I/O PROCESSING UNIT 140 | R/W | 901 |
| 1 | FILE I/O PROCESSING UNIT 150 | R | 902 |
| 2 | FILE I/O PROCESSING UNIT 160 | R/W | 903 |
| 3 | FILE I/O PROCESSING UNIT 161 | R | 904 |

176

(B)

| LOGICAL VOLUME NUMBER (401) | I/O PROCESSING UNIT NAME (402) | ACCESSIBILITY ATTRIBUTE (403) | |
|---|---|---|---|
| 1 | FILE I/O PROCESSING UNIT 140 | R | 905 |
| 2 | FILE I/O PROCESSING UNIT 800 | R/W | 906 |
| 2 | FILE I/O PROCESSING UNIT 140 | R/W | 907 |
| 3 | FILE I/O PROCESSING UNIT 140 | R/W | 908 |

802

(C)

| LOGICAL VOLUME NUMBER (401) | I/O PROCESSING UNIT NAME (402) | ACCESSIBILITY ATTRIBUTE (403) | |
|---|---|---|---|
| 1 | FILE I/O PROCESSING UNIT 140 | R | 905 |
| 2 | FILE I/O PROCESSING UNIT 801 | R/W | 906 |
| 2 | FILE I/O PROCESSING UNIT 140 | R | 909 |
| 3 | FILE I/O PROCESSING UNIT 140 | R/W | 908 |

| VIRTUAL LOGICAL VOLUME NUMBER | STORAGE NAME: LOGICAL VOLUME NUMBER IN STORAGE | WORM ATTRIBUTE | |
|---|---|---|---|
| 1 | STORAGE 120:1 | No | 1001 |
| 2 | STORAGE 120:2 | No | 1002 |
| 3 | STORAGE 120:3 | No | 1003 |
| 4 | STORAGE 130:1 | Yes | 1004 |

176

(B)

| VIRTUAL LOGICAL VOLUME NUMBER | STORAGE NAME: LOGICAL VOLUME NUMBER IN STORAGE | WORM ATTRIBUTE | |
|---|---|---|---|
| 1 | STORAGE 130:1 | No | 1005 |
| 2 | STORAGE 130:2 | No | 1006 |
| 3 | STORAGE 120:1 | No | 1007 |
| 4 | STORAGE 120:2 | No | 1008 |

805

(C)

| VIRTUAL LOGICAL VOLUME NUMBER | STORAGE NAME: LOGICAL VOLUME NUMBER IN STORAGE | WORM ATTRIBUTE | |
|---|---|---|---|
| 1 | STORAGE 130:1 | No | 1005 |
| 2 | STORAGE 130:2 | No | 1006 |
| 3 | STORAGE 120:1 | No | 1007 |
| 4 | STORAGE 120:2 | Yes | 1008 |

| LOGICAL VOLUME NUMBER | I/O PROCESSING UNIT NAME | ACCESSIBILITY ATTRIBUTE | |
|---|---|---|---|
| 1 | FILE I/O PROCESSING UNIT 150 | R/W | ~1401 |
| 1 | FILE I/O PROCESSING UNIT 161 | R/W | ~1402 |
| 2 | FILE I/O PROCESSING UNIT 150 | R/W | ~1403 |
| 3 | FILE I/O PROCESSING UNIT 160 | R | ~1404 |

185

(B)

| LOGICAL VOLUME NUMBER | I/O PROCESSING UNIT NAME | ACCESSIBILITY ATTRIBUTE | |
|---|---|---|---|
| 1 | FILE I/O PROCESSING UNIT 150 | R/W | ~1401 |
| 1 | FILE I/O PROCESSING UNIT 161 | R | ~1402 |
| 2 | FILE I/O PROCESSING UNIT 150 | R/W | ~1403 |
| 3 | FILE I/O PROCESSING UNIT 160 | R | ~1404 |

| VIRTUAL LOGICAL VOLUME NUMBER | STORAGE NAME: LOGICAL VOLUME NUMBER IN STORAGE | WORM ATTRIBUTE | |
|---|---|---|---|
| 1 | STORAGE 120:1 | No | 1501 |
| 2 | STORAGE 120:2 | Yes | 1502 |
| 3 | STORAGE 120:3 | No | 1503 |
| 4 | STORAGE 130:1 | No | 1504 |

176

(B)

| VIRTUAL LOGICAL VOLUME NUMBER | STORAGE NAME: LOGICAL VOLUME NUMBER IN STORAGE | WORM ATTRIBUTE | |
|---|---|---|---|
| 1 | STORAGE 120:1 | No | 1501 |
| 2 | STORAGE 120:2 | Yes | 1502 |
| 3 | STORAGE 120:3 | No | 1503 |
| 4 | STORAGE 130:1 | Yes | 1505 |

| BACKUP SOURCE LOGICAL VOLUME NUMBER | BACKUP DESTINATION LOGICAL VOLUME NUMBER | |
|---|---|---|
| 1 | 3 | 1203 |
| 2 | 4 | 1601 |

| LOGICAL VOLUME NUMBER (401) | I/O PROCESSING UNIT NAME (402) | ACCESSIBILITY ATTRIBUTE (403) | |
|---|---|---|---|
| 1 | FILE I/O PROCESSING UNIT 140 | R/W | 1901 |
| 1 | FILE I/O PROCESSING UNIT 161 | R/W | 1902 |
| 2 | FILE I/O PROCESSING UNIT 150 | R/W | 1903 |
| 3 | FILE I/O PROCESSING UNIT 160 | R | 1904 |

185

(B)

| LOGICAL VOLUME NUMBER (401) | I/O PROCESSING UNIT NAME (402) | ACCESSIBILITY ATTRIBUTE (403) | |
|---|---|---|---|
| 1 | FILE I/O PROCESSING UNIT 140 | R/W | 1901 |
| 1 | FILE I/O PROCESSING UNIT 161 | R | 1902 |
| 2 | FILE I/O PROCESSING UNIT 150 | R/W | 1903 |
| 3 | FILE I/O PROCESSING UNIT 160 | R | 1904 |

| VIRTUAL LOGICAL VOLUME NUMBER | STORAGE NAME: LOGICAL VOLUME NUMBER IN STORAGE | WORM ATTRIBUTE | |
|---|---|---|---|
| 1 | STORAGE 120:1 | No | 2001 |
| 2 | STORAGE 120:2 | Yes | 2002 |
| 3 | STORAGE 120:3 | No | 2003 |
| 4 | STORAGE 130:1 | No | 2004 |

176

(B)

| VIRTUAL LOGICAL VOLUME NUMBER | STORAGE NAME: LOGICAL VOLUME NUMBER IN STORAGE | WORM ATTRIBUTE | |
|---|---|---|---|
| 1 | STORAGE 120:1 | No | 2001 |
| 2 | STORAGE 120:2 | Yes | 2002 |
| 3 | STORAGE 120:3 | No | 2003 |
| 4 | STORAGE 130:1 | Yes | 2004 |

| DATA BLOCK NUMBER (2201) | WORM ATTRIBUTE (2202) |
|---|---|
| 1 | No |
| 2 | Yes |
| 3 | No |
| ... | ... |
| n | No |

| VIRTUAL LOGICAL VOLUME NUMBER (2301) | STORAGE NAME: LOGICAL VOLUME NUMBER IN STORAGE (2302) |
|---|---|
| 1 | STORAGE 120:1 |
| 2 | STORAGE 120:2 |
| 3 | STORAGE 120:3 |
| 4 | STORAGE 130:1 |

| LOGICAL VOLUME NUMBER 401 | I/O PROCESSING UNIT NAME 402 | ACCESSIBILITY ATTRIBUTE 403 | |
|---|---|---|---|
| 1 | FILE I/O PROCESSING UNIT 140 | R/W | 2501 |
| 1 | FILE I/O PROCESSING UNIT 161 | R/W | 2502 |
| 2 | FILE I/O PROCESSING UNIT 150 | R/W | 2503 |
| 3 | FILE I/O PROCESSING UNIT 160 | R | 2504 |

185

(B)

| LOGICAL VOLUME NUMBER 401 | I/O PROCESSING UNIT NAME 402 | ACCESSIBILITY ATTRIBUTE 403 | |
|---|---|---|---|
| 1 | FILE I/O PROCESSING UNIT 140 | R/W | 2501 |
| 1 | FILE I/O PROCESSING UNIT 161 | R | 2502 |
| 2 | FILE I/O PROCESSING UNIT 150 | R/W | 2503 |
| 3 | FILE I/O PROCESSING UNIT 160 | R | 2504 |

185

STORAGE APPARATUS FOR PREVENTING FALSIFICATION OF DATA

CROSS-REFERENCES TO RELATED APPLICATIONS

This application relates to and claims priority from Japanese Patent Application No. 2006-000030, filed on Jan. 4, 2006, the entire disclosure of which is incorporated herein by reference.

BACKGROUND

The present invention relates to a storage apparatus system for preventing the falsification of data.

In recent years, the United States is obligating specific organizations to store specific data in a state where it cannot be falsified during a designated period. For instance, the HIPM (Health Insurance Portability and Accountability Act), which is a law concerning the interoperability and accountability of health insurance, is obligating medical institutions to store the medical data of patients for two years after the death of patients. Further, SEC17a-4 is obligating financial institutions and securities firms to store business logs including e-mails for as long as such institution or firm exists. An organization in default of these obligations will be subject to punishment by fine or imprisonment. Thus, demands are increasing for a function of guaranteeing that data will not be falsified during the retention period.

Conventionally, these organizations stored such data with a retention period in a non-rewritable, recordable recording medium such as a tape or optical disk. A data recording format in which data can only be written once and cannot be deleted or changed as described above is referred to as WORM (Write Once Read Many). Nevertheless, a recording medium such as a tape or optical disk has a tow data I/O processing performance, and there is a problem in that it is insufficient in storing the vast amounts of data in recent years. Further, with a non-rewritable, recordable recording medium, even when the data is no longer required after the lapse of the retention period, there is a problem in that it is not possible to improve the utilization efficiency by deleting such data.

Thus, the gazette of US20040186858 (Patent Document 1) discloses technology of recording data with a retention period in a magnetic disk, which is a rewritable storage medium having a high I/O processing performance. The system disclosed in Patent Document 1 is configured from a user terminal and a file server. The file server is interconnected to the user terminal, and performs I/O processing of data in file units. Further, the file server has a magnetic disk for storing files transmitted from the user terminal.

An administrator of the file server defines a part of the storage area of a magnetic disk of the file server as a storage area (hereinafter referred to as a "WORM area") dedicated to storing files with a retention period (hereinafter referred to as a "WORM file"). When an administrator of the file server issues a command for deleting or migrating the WORM area, the file server returns an error. Further, the file server retains an attribute value showing that it is a WORM area in the file server for recognizing which storage area is a WORM area. The user terminal connected to the file server configures a file as a WORM file by issuing a specific command containing the file retention period to the files stored in the WORM area.

When the file server receives a rewrite request of a file from the user terminal, it checks whether such file is a WORM file. If it is a WORM file, the file server checks whether the file retention period has already lapsed. If the file retention period has not lapsed, the file server does not permit the rewrite request of the file, and notifies the user terminal that the file cannot be rewritten. Like this, a retention period is set for each file, and it is thereby possible to guarantee that the file will not be falsified by the administrator of the user terminal or file server during the retention period.

SUMMARY

Patent Document 1 discloses a technique where the file server uses a storage area in a storage connected to the file server as a WORM area. Nevertheless, with the system described in Patent Document 1, when the file server is to use a storage area of another storage (hereinafter referred to as an "external storage") connected via a storage connected to the file server as the storage destination of the file, there is a possibility that a file in such external storage cannot be managed as a WORM file. In Patent Document 1, since the file server retains information regarding whether the storage area in the external storage is a WORM area, the external storage is not able to recognize that the storage area in the external storage provided to the file server is being used as a WORM area. Thus, the external storage may permit the user terminal connected to the external storage, without going through the file server, to access the WORM area, and there is a possibility that the user terminal may rewrite the WORM file.

Further, if the user terminal connected to the external storage is not equipped with the same file system as the file server, even if it is able to recognize that a storage area is a WORM area, it will not be able to recognize the files stored in the WORM area. Thus, there is a possibility that a user terminal connected to the external storage may rewrite the data in the WORM area.

Thus, the file server is not able to guarantee that a WORM file will not be falsified by another user terminal connected to the external storage.

Thus, with the present invention, in a case where the file server is to create a WORM area in the external storage, provided is a system for preventing a user terminal connected to external storage, without going through the file server, from rewriting files stored in a WORM area.

In a storage system having a plurality of storages respectively connected to a plurality of computers, a first storage has a unit for managing the access authority to data contained in a storage of one's own storage and in a storage area of another storage provided to the own storage. The first storage makes an inquiry to a second storage on whether it is possible to change the access authority regarding the storage area in the second storage, and commands the change of access authority. A computer connected to the second storage determines the accessibility based on the access authority configured in a storage area when making an access request to the storage area in the second storage.

According to the present invention, in a case where the file server is to create a WORM area in the external storage, it is possible to prevent a user terminal connected to external storage, without going through the file server, from rewriting files stored in a WORM area.

DESCRIPTION OF DRAWINGS

FIG. 2 is a configuration showing an example of the logical volume management table pertaining to the first embodiment;

FIG. 3 is a configuration showing an example of the storage management table pertaining to the first embodiment;

FIG. 4 is a configuration showing an example of the access management table pertaining to the first embodiment;

FIG. 5 is a flowchart showing the WORM logical volume creation processing pertaining to the first embodiment;

FIG. 6 is a configuration showing the access management table pertaining to the first embodiment after the falsification prevention processing;

FIG. 7 is a configuration showing the logical volume management table pertaining to the first embodiment after the falsification prevention processing;

FIG. 9(A)-(C) are configuration showing the access management table pertaining to the second embodiment after the falsification prevention processing;

FIG. 10(A)-(C) are configuration showing the logical volume management table pertaining to the second embodiment after the falsification prevention processing;

FIG. 14(A)-(B) are configuration showing the access management table pertaining to the third embodiment in its initial state and after the falsification prevention processing;

FIG. 15(A)-(B) are configuration showing the logical volume management table pertaining to the third embodiment in its initial state and after the falsification prevention processing;

FIG. 16 is a configuration showing the backup management table pertaining to the third embodiment after the creation of the WORM logical volume;

FIG. 19(A)-(B) are configuration showing the access management table pertaining to the fourth embodiment after the falsification prevention processing;

FIG. 20(A)-(B) are configuration showing the logical volume management table pertaining to the fourth embodiment after the falsification prevention processing;

FIG. 22 is a configuration showing the WORM attribute pertaining to the fifth embodiment;

FIG. 23 is a configuration showing an example of the logical volume management table pertaining to the fifth embodiment;

FIG. 25(A)-(B) are configuration showing the access management table pertaining to the fifth embodiment in its initial state and after the falsification prevention processing;

DETAILED DESCRIPTION

Figure 1:
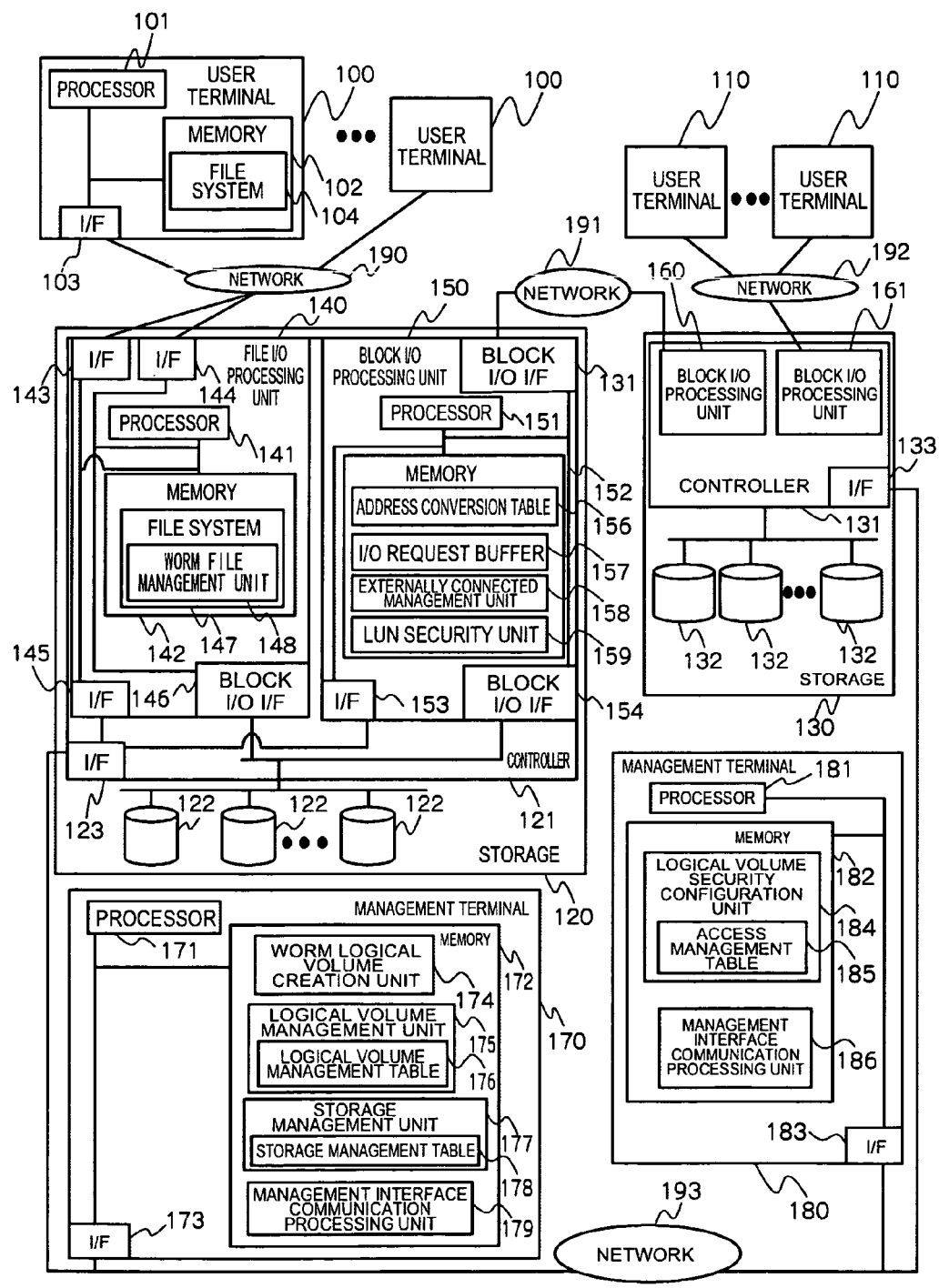
FIG. 1 is a configuration showing the system pertaining to the first embodiment.

The first to fifth embodiments are now explained as embodiments of the present invention.

The first embodiment relates to a system where a certain storage manages a storage area in another storage provided to one's own storage, and creates a WORM are in such other storage. Specifically, a management terminal of a first storage identifies whether it is possible to configure security to a second storage, and, when such security configuration is possible, it makes an inquiry to a management terminal of the second storage on whether it is possible to change a storage area in the second storage to a WORM area which only permits the rewriting from an I/O processing unit of the first storage. Upon receiving from the management terminal of the second storage a command permitting the change of such storage area into a WORM area, the management terminal of the first storage commands the management terminal of the second storage to execute the change of access authority based on the foregoing change. When the second storage executes the change of access authority, the management terminal of the first storage updates information for identifying whether the respective storage areas in the first storage and the second storage provided to the first storage are WORM areas.

The second embodiment relates to a system where a plurality of storages create a WORM area in another storage connected respectively to such plurality of storages. In the second embodiment, the management terminal of the respective storages includes a unit for identifying whether it is possible to configure security to another storage, a unit for commanding a storage area in another storage to be changed to a WORM area which permits the rewriting only by an I/O processing unit of the own storage, a unit for changing the storage area in the own storage into a WORM area, and a unit for identifying whether the respective storage areas in the own storage and other storage are WORM areas.

The third embodiment is for configuring a backup storage area in a WORM area when a certain storage is to create such backup storage area in another storage connected to the own storage. The management terminal of the first storage, which is a backup source, has a table for associating the backup source and the storage area of the backup destination, and changes the storage area of the second storage, which is the backup destination, into a WORM area.

The fourth embodiment is for a management terminal to configure a WORM area in the respective storages in a system where a single management terminal and a plurality of storages are connected. Here, the management terminal includes a unit for identifying whether it is possible to configure security to the respective storages, a unit for commanding a storage area in certain storage to be changed to a WORM area which permits the rewriting only by an I/O processing unit of the own storage, a unit for changing the storage area in the respective storages into a WORM area, and a unit for identifying whether the respective storage areas in the respective storages are WORM areas.

The fifth embodiment is for a management terminal of a storage to change an attribute of a storage area in a storage configured with such attribute indicating whether the data is a WORM-type data per data unit. A first storage includes a unit for storing a storage area and a WORM attribute as a pair. The management terminal of the first storage identifies whether it is possible to configure security to a second storage, and, when such security configuration is possible, it makes an inquiry to a management terminal of the second storage on whether it is possible to change a storage area in the second storage to a WORM area which only permits the rewriting from an I/O processing unit of the first storage. Upon receiving from the management terminal of the second storage a command permitting the change of such storage area into a WORM area, the management terminal of the first storage commands the management terminal of the second storage to execute the change of access authority based on the foregoing change. When the foregoing change is executed, the first storage provides and stores a WORM attribute per data unit to all data in the changed storage area.

The respective embodiments are now explained with reference to the drawings.

Embodiment 1

The first embodiment is now explained with reference to FIG. 1 to FIG. 7.

FIG. 1 is a configuration showing the system pertaining to the first embodiment. The system of this embodiment is configured from a plurality of user terminals 100 and 110, a storage 120 connected to the user terminal 100, a storage 130 connected to the user terminal 110, and management terminals 170 and 180 for managing the storages 120 and 130.

The user terminals 100 and 110 are terminals that use the storages 120 and 130.

The user terminal 110 is configured from a processor 101 for performing arithmetic processing, a memory 102 as a storage means to be used upon performing the arithmetic processing, and an interface (hereinafter abbreviated as "I/F") 103. The processor 101 reads a program into the memory 102 and executes such program, and communicates with another apparatus via the I/F 103. As the program to be read in the memory 102 and executed by the processor 101, for example, a file system 104 may be used.

The user terminal 100 is interconnected with a file I/O processing unit 140 in the storage 120 via a network 190, and transmits and receives data in file units. The network 190, for instance, may be configured with a LAN (Local Area Network) as a representative example of a file I/O network.

The user terminal 110 is configured from a processor, a memory and an I/F as with a user terminal. The user terminal 110 is interconnected to a block I/O processing unit 161 in the storage 130 via a network 192, and transmits and receives data in fixed length data units referred to as a block. The network 192, for instance, may be configured with a SAN (Storage Area Network) as a representative example of a file I/O network.

The storages 120 and 130 store data to be used by the user terminals 100 and 110. The storages 120 and 130 are respectively configured from controllers 121 and 131, and storage mediums 122 and 132 storing data of the user terminals 100 and 110. As a representative example of the storage mediums 122 and 132, a magnetic disk, flash memory and so on may be used. Otherwise, so as long as it is a rewritable storage medium, any type of storage medium may be used.

The controller 121 has the role of controlling the storage medium 122. The controller 121 has the role of providing an aggregate of partial storage areas of a plurality of disk drives to an I/O processing unit as a single virtual storage area (hereinafter referred to as a "logical volume"). The controller 121 has a file I/O processing unit 140, a block I/O processing unit 150, and an I/F 123. The I/F 123 is connected to a management terminal 170 via a management network 193. As a representative example of the management network 193, a LAN (Local Area Network) may be used.

Incidentally, the controller 131 has the role of controlling the storage medium 132, and has block I/O processing units 160 and 161, and an I/F 133. The I/F 133 is connected to a management terminal 180 via the management network 193.

The file I/O processing unit 140 has the role of receiving a file operation request from a user, and storing data in file units in a logical volume provided by the controller 121, and extracting such data. The file I/O processing unit 140 is configured from a processor 141, a memory 142, an I/F 143, an I/F 144, an I/F 145, and a block I/O I/F 146. The processor 141 reads a program into the memory 142 and executes such program, and communicates with another apparatus via the I/Fs 143, 144, 145 and block I/O I/F 146. As a program to be read into the memory 141 and executed by the processor 141, for example, a file system 147 and a WORM file management unit 148 to be executed with the file system 147 may be used. Incidentally, the file system 147 is a file system having compatibility with the file system of the user terminal 100 for transmitting and receiving data in file units between the user terminal 100 and storage 120.

The processor 141 transmits and receives control information such as a file operation request to and from the user terminal 100 via the network 190 connected to the I/F 143, and transmits and receives control information to and from the management terminal 170 based on the management network 193 connected via the I/F 145 and I/F 123 of the controller 121. Further, the processor 141 transmits and receives data to and from the user terminal 100 via the network 190 connected to the I/F 144, and operates data stored in the storage medium 122 via the block I/O I/F 146.

Incidentally, as a representative example of a file operation request from a user, a file operation request conforming to NFS (Network File System), CIFS (Common Internet File System) or FTP (File Transfer Protocol) may be used.

The block I/O processing unit 150 has the role of receiving a block operation request from a user, storing data in block units in a logical volume provided by the controller 121, and extracting such data. The block I/O processing unit 150 is configured from a processor 151, a memory 152, an I/F 153, a block I/O I/F 154, and a block I/O I/F 155. The processor 151 reads a program into the memory 152 and executes such program, and communicates with another apparatus via the I/F 153, and block I/O I/Fs 154, 155. As a program to be read into the memory 152 and executed by the processor 151, for instance, an address conversion table 156, an I/O request buffer 157, an externally connected management unit 158 and a LUN security unit 159 may be used.

When a block I/O processing unit of an external storage is connected to the block I/O processing unit 150 of the storage 120, the externally connected management unit 158 has a function of managing the use of data in the storage area of such external storage. The LUN security unit 159 has a function of determining the accessibility to the access request from a computer in which a network is connected to the block I/O processing unit 150. In this embodiment, the block I/O processing unit 150 of the storage 120 and the block I/O processing unit 160 of the storage 130 are connected via the network 191, and the storage medium 132 contained in the storage 130 is provided to the file I/O processing unit 140. Further, the storage area of the external storage is managed by a logical volume management unit of the management terminal 170 described later.

The processor 151 transmits and receives control information to and from the file I/O processing unit 140 via the I/F 153, and transmits and receives control information to and from the management terminal 170 based on the management network 193 connected via the I/F 123 of the controller 121. Further, the processor 151 operates the data stored in the storage medium 122 via the block I/O I/F 154, and operates the data stored in the storage medium 132 via the block I/O processing unit 155 and network 191.

Incidentally, block I/O processing units 160 and 161 are configured the same as the block 150, and the detailed explanation thereof is omitted.

Incidentally, as a representative example of a block operation request from a user, a block operation request conforming to the SCSI (Small Computer System Interface) standard or ATA (AT Attachment) standard may be used.

The management terminal 170 is a terminal for managing the storage 120. The management terminal 170 is configured from a processor 171, a memory 172, and an I/F 173. The processor 171 reads a program into the memory 172 and executes such program, and communicates with another apparatus connected to the management network 193 via the I/F 173. As a program to be read into the memory 172 and executed by the processor 171, a WORM logical volume creation unit 174, a logical volume management unit 175, a storage management unit 177 and a management interface communication processing unit 179 may be used.

The WORM logical volume creation unit 174 has the role of inputting a logical volume number and defining the logical number corresponding to the logical volume number as a logical volume (hereinafter referred to as a "WORM logical volume") for preventing the falsification of data from a unit other than the designated I/O processing unit. The storage 120 is able to know which logical volume is a WORM logical volume based on a logical volume management table 176 (described later), and is thereby able to determine whether to permit the falsification operation to the files in the logical volume contained in the storage 120. As a representative example of a falsification operation to files in the logical volume, deletion of files in the logical volume, migration of files in the logical volume, change of retention period of files in the logical volume, and rewriting processing of files in the logical volume by an unauthorized computer may be considered.

The logical volume management unit 175 adds a unique identifier referred to as a virtual logical volume number to the logical volume of the storage 120 and the logical volume provided from the external storage. When the I/O processing unit of the storage 120 accesses the logical volume provided with the virtual logical volume number, the logical volume management unit specifies the pertinent logical volume in the corresponding storage from the virtual logical volume number. And then the logical volume management unit returns the access destination of the logical volume specified from the virtual logical volume number to the I/O processing unit. Thereby, the I/O processing unit 140 and I/O processing unit 150 are able to use the logical volume without having to be aware of the location of the logical volume. Further, the each of the logical volumes is a WORM logical volume. Thereby, the management terminal 170 is able to identify which logical volume is a WORM logical volume. The logical volume management unit 175 has a logical volume management table 176 for combining and retaining the virtual logical volume number, a storage actually having the logical volume and a logical volume number in such storage, and a WORM attribute showing that the logical volume is a WORM logical volume.

The storage management unit 177 manages the availability of security configuration of the external storage connected via the own storage and block I/O processing unit 150. Availability of security configuration means whether it is possible to restrict the accessible I/O processing unit to the respective logical volumes of the storage. The storage management unit 177 has a storage management table 178 for combining and retaining the own storage and external storage, and availability of security configuration.

The management interface communication processing unit 179 processes the communication relating to the storage management between management terminals. As a representative example of the communication relating to storage management, SMI-S (Storage Management Interface-Standard) may be used.

The management terminal 180 is a terminal for managing the storage 130. The management terminal 180 is configured from a processor 181, a memory 182, and an I/F 183. The processor 181 reads a program into the memory 182 and executes such program, and communicates with another apparatus connected to the management network 193 via the I/F 183. As a program to be read into the memory 182 and executed by the processor 181, a logical volume security configuration unit 184 and a management interface communication processing unit 186 may be used.

The logical volume security configuration unit 184 manages the type of access authority permitted to which I/O processing unit regarding the respective volumes of the storage 130. The logical volume security configuration unit 184 has an access management table 185 for combining and retaining the logical volume number, an I/O processing unit and its access authority.

Incidentally, the memory contained in the user terminals 100, 110, file I/O processing unit 140, block I/O processing units 150, 160, 161, and management terminals 170, 180 may be configured from a RAM (Random Access Memory) or the like. Further, the processor contained in the user terminals 100, 110, file I/O processing unit 140, block I/O processing units 150, 160, 161, and management terminals 170,180 may be an arithmetic processing apparatus configured from a CPU (Central Processing Unit).

Incidentally, the foregoing functional modules such as the WORM logical volume creation unit 174, logical volume management unit 175, storage management unit 177 and management interface communication processing unit 179 may be realized with software as described above, or as hardware with an arbitrary CPU or other LSI, or based on the combination of software and hardware. Further, the foregoing configuration may also be employed in the functional modules of other components other than the management terminal 170, such as user terminals 100 and 110, file I/O processing unit 140, block I/O processing units 150, 160 and 161, controllers 121 and 131 of the management terminal 180.

FIG. 2 is a configuration showing an example of a logical volume management table 176. The logical volume management table 176 has a plurality of entries 210 to 213 setting a virtual logical volume number 201, a storage name and storage logical volume number 202 in which the logical volume actually exists, and a WORM attribute 203.

The virtual logical volume number 201 stores, as a virtual logical volume number an identifier for uniquely identifying the logical volume in the storage and the logical volume provided to the own storage in the connected storage.

The storage name and storage logical volume number 202 stores identifying information of a storage in which the logical volume shown in the virtual logical volume number 201 actually exists, and identifying information of a logical volume shown with the virtual logical volume number 201 in the storage. In this embodiment, the storage name and logical volume number are respectively stored therein.

The WORM attribute 203 stores information as a flag showing whether the logical volume is a WORM logical volume. In this embodiment, when the logical volume is a WORM logical volume, "Yes" is stored in the WORM attribute 203, and when it is not a WORM logical volume, "No" is stored in the WORM attribute 203.

For example, information stored in the entry 210 represents that the logical volume provided with the virtual logical volume number 1 is actually a logical volume provided with the logical volume number 1 of the storage 120, and is not a WORM logical volume. Further, information stored in the entry 213 represents that the logical volume provided with the virtual logical volume number 4 is actually a logical volume provided with the logical volume number 1 of the storage 130, and is not a WORM logical volume.

FIG. 3 is a configuration showing an example of the storage management table 178. The storage management table 178 has a plurality of entries 310 to 311 setting a storage name 301 and a security configuration flag 302.

The storage name 301 stores an identifier of an externally connected storage.

The security configuration flag 302 stores information as a flag showing the availability of security configuration of the storage shown with the storage name 301. In this embodiment, when the storage shown with the storage name 301 has a logical volume security configuration unit 184, "Yes" is stored in the security configuration flag 302 indicating that security configuration is possible.

For example, information stored in the entry 310 shows that the storage 120 has a logical volume security configuration unit 184. Further, information stored in the entry 311 shows that the storage 130 has a logical volume security configuration unit 184.

As a representative example of a method for configuring the storage management table 178, there is a method of receiving information from a support center researching the availability of logical volume security configuration of another company's storage. In addition, there is a method of conducting a logical volume security configuration test to the external storage through the management interface communication processing unit 116 and confirming whether such configuration is possible.

FIG. 4 is a configuration showing an example of an access management table 185. The access management table 185 has a plurality of entries 410 to 413 setting a logical volume number 401, an I/O processing unit name 402, and an access permission attribute 403 of such I/O processing unit.

The logical volume number 401 stores numbers for the storage to uniquely identify the respective logical volumes.

The I/O processing unit name 402 stores the identifier of I/O processing units permitted to access the logical volume shown with the logical volume number 401.

The access permission attribute 403 stores the type of access permitted to the I/O processing unit shown with the I/O processing unit name 402. In this embodiment, "R/W" is stored when the reading and writing of data are permitted, and "R" is stored when the reading of data is permitted. Incidentally, indication of the type of access permitted may be pursuant to a different indication method.

For example, information stored in the entry 410 represents that the reading and writing of data from and in the file I/O processing unit 140 is permitted to the logical volume shown with the logical volume number 1. Further, information stored in the entry 412 represents that the reading and writing of data from and in the block I/O processing unit 150 is permitted to the logical volume shown with the logical volume number 2.

FIG. 5 is a flowchart showing the creation processing of a WORM logical volume. The WORM logical volume creation unit 174 commences the creation processing of the WORM logical volume upon receiving a request from the file I/O processing unit 140 to configure the specific logical volume as the WORM logical volume (step 501).

When the WORM logical volume creation unit 174 is to configure a certain logical volume given a virtual logical volume number in the logical volume management table 176 as a WORM logical volume, it accesses the logical volume management unit 175 and acquires the storage name and logical volume number of the external storage in which this logical volume actually exists (step 502).

Further, the WORM logical volume creation unit 174 accesses the storage management unit 177 and confirms whether the security configuration flag of the pertinent external storage in the storage management table 178 is set to "Yes" (step 503).

When the security configuration flag is "Yes" at step 503, the WORM logical volume creation unit 174 communicates with the management terminal of the pertinent external storage via the management interface communication processing unit 179, and accesses the logical volume security configuration unit 184 of the external storage. And, the WORM logical volume creation unit 174, from the entries in the access management table 185, extracts the I/O processing unit name 402 in which the I/O processing unit is other than the file I/O processing unit 140. If the access permission attribute of the extracted entry is "R/W", an inquiry made to the logical volume security configuration unit 184 on whether this can be set as "R" (step 504). For instance, as the method of making an inquiry, there is a method of displaying, upon receiving an inquiry from the logical volume security configuration unit 184, a message requesting the change of the access permission attribute and a dialog box for selecting "Yes" or "No" in the management terminal of the external storage, and having the administrator of the external storage select "Yes" or "No".

The management terminal of the external storage that received the inquiry (in the foregoing example, administrator of the external storage) replies to this inquiry. The reply to the inquiry is transferred to the WORM logical volume creation unit 174 via the management interface communication processing unit 179 (step 505).

When the reply to the inquiry is "Yes" at step 505, the WORM logical volume creation unit 174 accesses the management terminal of the external storage via the management interface communication processing unit 179, and requests the change of configuration to the logical volume security configuration unit 184 (step 506).

The logical volume security configuration unit 184, from the entries in the access management table 185, extracts an entry setting the logical volume number 401 of the pertinent logical volume and the I/O processing unit name 402 in which the I/O processing unit is other than the file I/O processing unit 140. And, if the access permission attribute 403 of the extracted entry is "R/W", this is set to "R". According to this setting, an I/O processing unit other than the file I/O processing unit 140 will be permitted to only read the data contained in the logical volume in which the access permission attribute 403 was changed to "R", and falsification processing such as rewriting or deletion will become impossible (step 507).

Further, the WORM logical volume creation unit 174 accesses the logical volume management unit 175, changes the WORM attribute 203 from "No" to "Yes" in the logical volume management table 176 regarding the logical volume in which the access permission attribute was changed with the access management table (step 508), and the processing is thereafter ended (step 510).

When the security configuration flag of the external storage is "No" at step 503 or when the reply from the management terminal of the external storage is "No" at step 505, the WORM logical volume creation unit 174 notifies the file I/O processing unit 140 that the processing (hereinafter referred to as "falsification prevention processing") for changing the WORM logical volume regarding the logical volume to be configured as a WORM logical volume cannot be performed (step 509), and the processing is thereafter ended (step 510).

The flow up to configuration of the WORM logical volume in this embodiment is now explained with reference to FIG. 6 and FIG. 7. In this example, the flow of falsification prevention processing is explained in a case when the file I/O processing unit 140 of the storage 120 requests the WORM logical volume creation unit 174 to change the logical volume provided with the virtual logical volume number 4 into a WORM logical volume.

FIG. 6 is a configuration showing the access management table 185 after the logical volume security configuration unit 184 changes the access permission attribute 403 to a logical volume, which is the target of falsification prevention processing.

FIG. 7 is a configuration showing a logical volume management table 176 after the WORM logical volume creation unit 174 changes the WORM attribute 203 to a logical volume, which is the target of falsification prevention processing.

The WORM logical volume creation unit 174 that received a request from the file I/O processing unit 140 accesses the logical volume management unit 175 and, from the entry 213 of the logical volume management table 176 shown in FIG. 2, recognizes that the virtual logical volume number 4 is the logical volume number 1 in the storage 130.

Next, the WORM logical volume creation unit 174 accesses the storage management unit 177 and confirms whether the security configuration flag 302 of the storage 130 is "Yes" from the entry 311 of the storage management table 178 shown in FIG. 3.

Since the security configuration flag 302 of the storage 130 is "Yes", the WORM logical volume creation unit 174 accesses the logical volume security configuration unit 184 of the storage 130 via the management interface communication processing unit 179, and, from the entries in the access management table 185 shown in FIG. 4, extracts the entry 411 in which the logical volume number 401 is 1 and the I/O processing unit name 402 is other than the file I/O processing unit 140. Since the access permission attribute 403 of the extracted entry 411 is "RAN", the WORM logical volume creation unit 174 makes an inquiry to the management terminal 180 as to whether the access permission attribute of the entry 411 can be set to "R".

When the administrator of the storage 130 replies "Yes" in the dialog box displayed on the management terminal 180, the WORM logical volume creation unit 174 requests the change of configuration to the logical volume security configuration unit 184 via the management interface communication processing unit 179. The logical volume security configuration unit 184, from the entries in the access management table 185 shown in FIG. 4, extracts the entry 411 in which the logical volume number 401 is 1 and the I/O processing unit name 402 is other than the file I/O processing unit 140. And, as shown in the entry 600 in the management table 185 of FIG. 6, the access permission attribute of the extracted entry 411 is changed from "R/W" to "R". Further, the WORM logical volume creation unit 174 accesses the logical volume management unit 175, and, as shown in the entry 700 in the logical volume management table 176 of FIG. 7, changes the WORM attribute 203 of the logical volume provided with the virtual logical volume number 4 from "No" to "Yes", and ends the processing.

As described above, according to the present invention, when the file I/O processing unit is to create a WORM logical volume in an externally connected storage, it is possible to prevent a computer (user terminal 110 in this embodiment) connected via the I/O processing unit (block I/O processing unit 161 in this embodiment) connected to the externally connected storage from rewriting the data stored in the WORM logical volume.

Embodiment 2

In the first embodiment, although explained was a case where a file I/O processing unit exists in only a single storage, there is also an embodiment where a plurality of storages have a file I/O processing unit and which mutually create a WORM logical volume. In this embodiment, explained is a case where a plurality of storages respectively have a file I/O processing unit.

The second embodiment is now explained with reference to FIG. 8 to FIG. 10.

Figure 8:
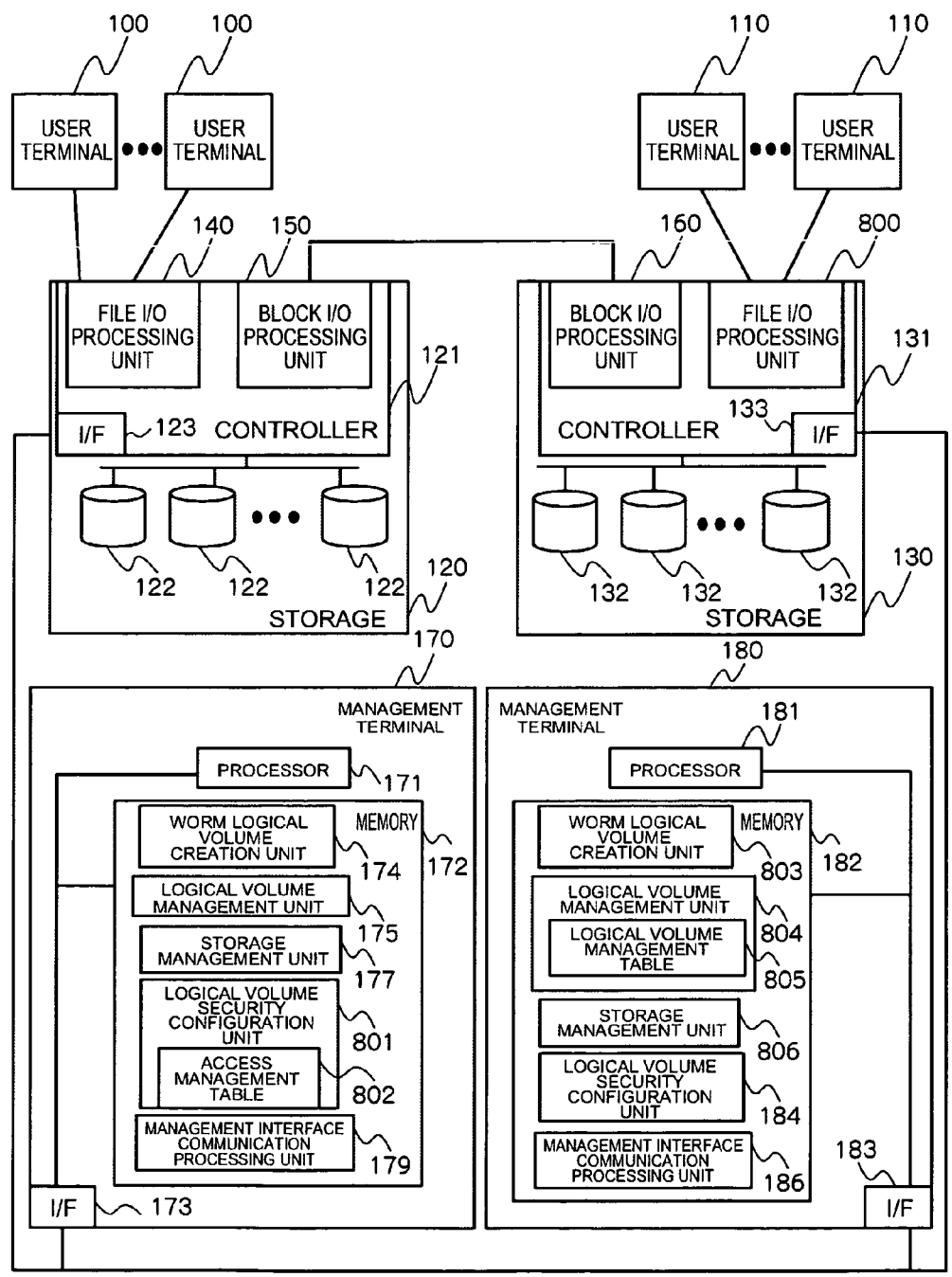
FIG. 8 is a configuration showing the system pertaining to the second embodiment.

FIG. 8 is a configuration showing the system pertaining to the second embodiment. The difference with FIG. 1 is explained below. The storage 130 additionally has a file I/O processing unit 800. The management terminal 170 additionally has a logical volume security configuration unit 801 and an access management table 802. The management terminal 180 additionally has a WORM logical volume creation unit 803, a logical volume management unit 804, a logical volume management table 805, and a storage management unit 806.

The flow up to the processing (falsification prevention processing) for changing a logical volume into a WORM logical volume in this embodiment is now explained with reference to FIG. 9 and FIG. 10. In this embodiment, the flow is explained in a case when the file I/O processing unit 800 requests the WORM logical volume creation unit 803 to change the logical volume provided with the virtual logical volume number 4 in the logical volume management table of the management terminal 180 into a WORM logical volume. Incidentally, the virtual logical volume number is independently added by the respective logical volume management units 175, 804 of the management terminals 170, 180.

FIG. 9(A) is a diagram showing the state of the access management table 185 in the logical volume security configuration unit 184 of the management terminal 180. FIG. 9(B) is a diagram showing the initial state of the access management table 802 in the logical volume security configuration unit 801 of the management terminal 170. FIG. 9(C) is a diagram showing the state after the access permission attribute 403 in the access management table 802 in the logical volume security configuration unit 801 of the management terminal 170 has been changed in the falsification prevention processing.

FIG. 10(A) is a diagram showing the state of the logical volume management table 176 in the logical volume management unit 175 of the management terminal 170. FIG. 10(B) is a diagram showing the initial state of the logical volume management table 805 in the logical volume management unit 804 of the management terminal 180. FIG. 10(C) is a diagram showing the state after the WORM attribute 203 in the logical volume management table 805 in the logical volume management unit 175 of the management terminal 180 has been changed in the falsification prevention processing.

The WORM logical volume creation unit 803 of the management terminal 180 that received a request from the file I/O processing unit 800 accesses the logical volume management unit 804 of the management terminal 180, and, from the entry 1008 of the logical volume management table 805 shown in FIG. 10(B), recognizes that the virtual logical volume number 4 is the logical volume number 2 in the storage 120.

Next, the WORM logical volume creation unit 803 of the management terminal 180 accesses the storage management unit 806 and confirms whether the security configuration flag of the storage 120 is "Yes".

Since the security configuration flag of the storage 130 is "Yes", the WORM logical volume creation unit 803 accesses the logical volume security configuration unit 801 of the storage 120 via the management interface communication processing unit 186, and, from the entries in the access management table 802 shown in FIG. 9(B), extracts the entry 907 in which the logical volume number 401 is 2 and the I/O processing unit name 402 is other than the file I/O processing unit 800. Since the access permission attribute 403 of the extracted entry 907 is "R/W", the logical volume creation unit 803 of the management terminal 180 makes an inquiry to the management terminal 170 (administrator of the storage 120 in this embodiment) as to whether the access permission attribute 403 of the entry 907 can be set to "R".

When the administrator of the storage 120 replies "Yes" in the dialog box displayed on the management terminal 170, the WORM logical volume creation unit 803 of the management terminal 180 requests the change of configuration of the access permission attribute to the logical volume security configuration unit 801 of the management terminal 170 via the management interface communication processing unit 186. The logical volume security configuration unit 801, from the entries in the access management table 802 shown in FIG. 9(B), extracts the entry 907 in which the logical volume number 401 is 2 and the I/O processing unit name 402 is other than the file I/O processing unit 800. And, as shown in the entry 909 in the access management table 802 of FIG. 9(C), the access permission attribute 403 of the extracted entry 907 is changed from "R/W" to "R". Further, the WORM logical volume creation unit 803 of the management terminal 180 accesses the logical volume management unit 804 of the management terminal 180, and, as shown in the entry 1009 in the logical volume management table 805 of FIG. 10(C), changes the WORM attribute 203 of the logical volume provided with the virtual logical volume number 4 from "No" to "Yes", and ends the processing.

Like this, in the second embodiment, it is possible to perform falsification prevention processing from the management terminal 180 to the storage 120. Further, since the falsification prevention processing can also be performed from the management terminal 170 to the storage 130 as explained in first embodiment, it is possible to perform falsification prevention processing in both management terminals 170 and 180 to the storages 130 and 120 as the respective external storages thereof. Accordingly, even in cases when two storages are to mutually provide a logical volume, it is possible to prevent the falsification from the I/O processing unit of the externally connected storage to the WORM logical volume of the own storage.

Embodiment 3

In the second embodiment, when backing up the WORM logical volume created inside the storage in an external storage, it is necessary to prevent the falsification of the logical volume of the backup destination. Thus, there is also an embodiment of creating a WORM logical volume as the backup logical volume.

The third embodiment is now explained with reference to FIG. 11 to FIG. 16.

Figure 11:
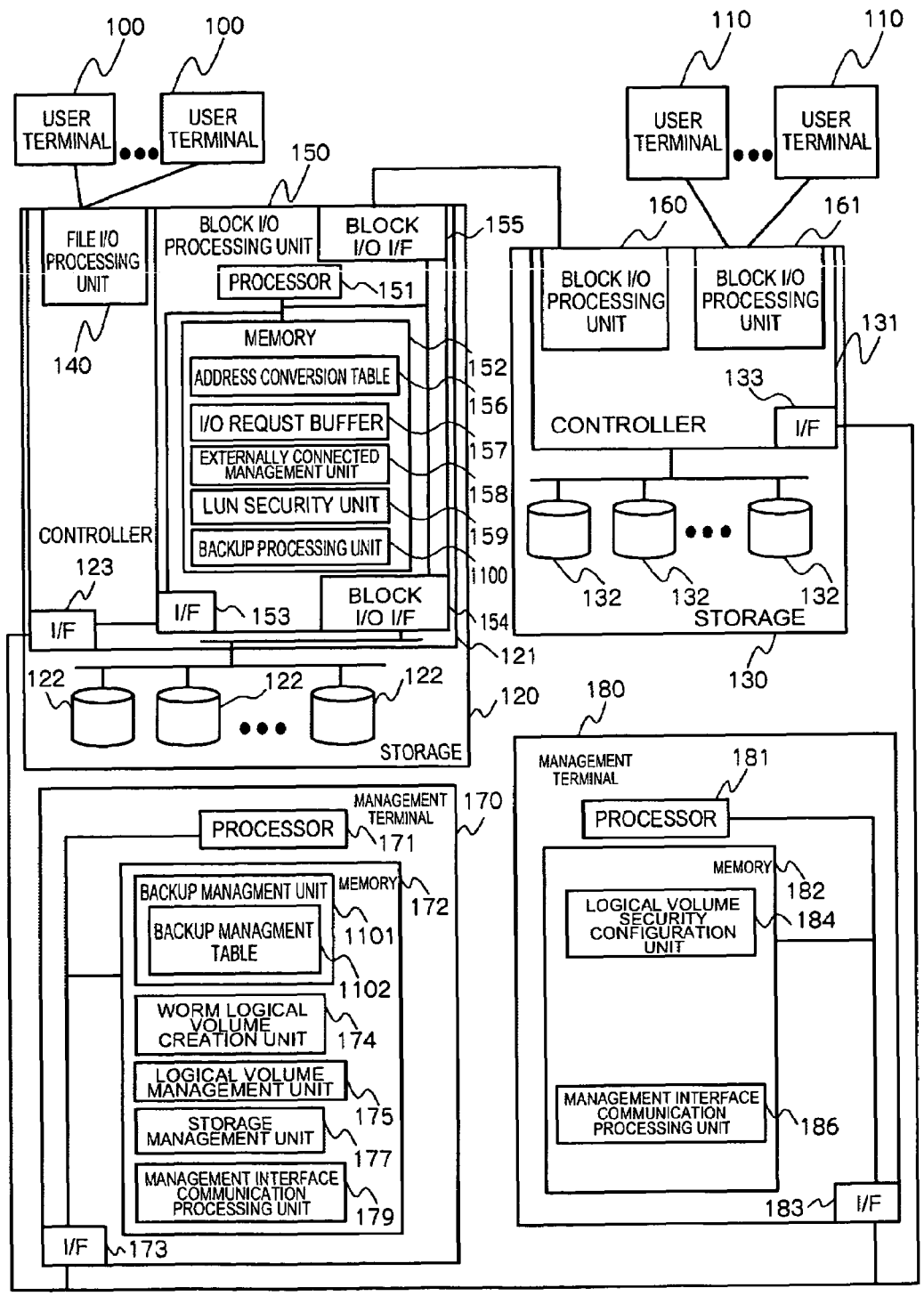
FIG. 11 is a configuration showing the system pertaining to the third embodiment.

FIG. 11 is a configuration showing the system pertaining to the third embodiment. The difference with FIG. 1 is explained below.

The block I/O processing unit 150 of the storage 120 has a backup processing unit 1100. The backup processing unit 1100 backs up the logical volume of the storage 120 in the storage 130. Here, "backup" refers to the operation of copying data of the logical volume designated as the backup source in the logical volume designated as the backup destination in a predetermined time interval. A predetermined time interval may be one day or one month, and the time interval may be arbitrarily set in this embodiment.

The management terminal 170 has a backup management unit 1101. The backup management unit 1101 has the role of managing the replication of the WORM logical volume to be backed up by respectively adding the virtual logical volume number of the backup source and the virtual logical volume number of the backup destination. The backup management unit 1101 has a backup management table 1102 for combining and retaining the logical volume number of the backup source and the logical volume number of the backup destination.

Figure 12:
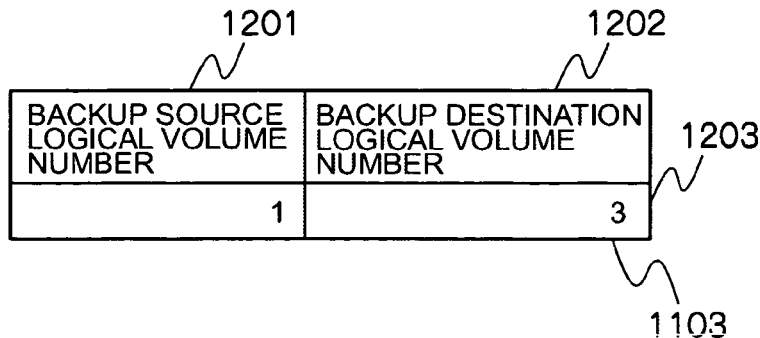
FIG. 12 is a configuration showing an example of the backup management table pertaining to the third embodiment.

FIG. 12 is a configuration showing an example of a backup management table 1102 pertaining to the third embodiment. The backup management table 1102 has a plurality of entries 1203 setting a backup source logical volume number 1201 and a backup destination logical volume number 1202.

The backup source logical volume number 1201 has registered therein a virtual logical volume number of the logical volume storing data to be backed up.

The logical volume number 1202 of the backup destination has registered therein a virtual logical volume number of the logical volume for storing the backup data.

For example, the entry 1203 of the backup management table 1102 represents that the data stored in the logical volume of the virtual logical volume number 1 is backed up and stored in the logical volume of the virtual logical volume number 3.

Figure 13:
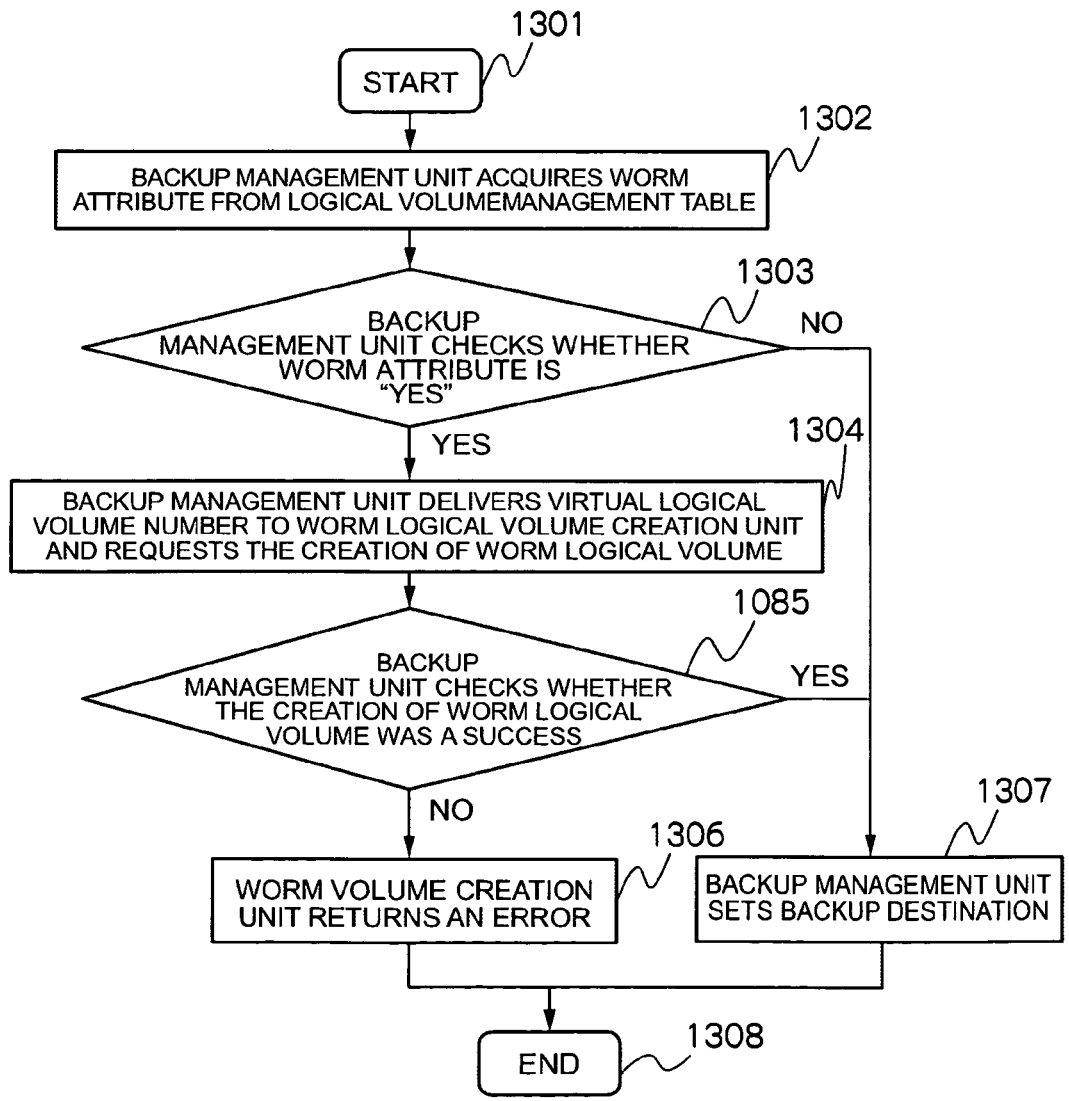
FIG. 13 is a flowchart showing the WORM logical volume creation processing pertaining to the third embodiment.

FIG. 13 shows the flow of processing to be performed by the backup management unit 1101 when the backup management unit 1101 receives a backup request. This processing is commenced by the file I/O processing unit 140 executing a backup request to the backup management unit 1101 (step 1301).

The backup management unit 1101 that received a backup request accesses the logical volume management unit 175, and, from the logical volume management table 176, acquires the WORM attribute 203 of the logical volume shown with the virtual logical volume number of the backup source (step 1302). Next, the backup management unit 1101 checks to see whether the acquired WORM attribute 203 is "Yes" (step 1303).

When the acquired WORM attribute 203 is "Yes" at step 1303, the backup management unit 1101 delivers the virtual logical volume number of the backup destination to the WORM logical volume creation unit 174, and requests the creation of the WORM logical volume (step 1304).

Next, the backup management unit 1101 confirms whether the creation of the requested WORM logical volume was successful (step 1305).

At step 1305, if the creation of the WORM logical volume failed as a result of requesting the creation of the WORM logical volume, the WORM logical volume creation unit 174 returns an error to the backup request source and ends the processing (step 1306).

When the WORM attribute 203 of the logical volume of the backup source is "No" at step 1303 or the creation of the WORM logical volume was successful at step 1305, the combination of the virtual logical volume number of the backup source and the virtual logical volume number of the backup destination is newly created as an entry of the backup management table 1102, and the processing is ended thereby (step 1307).

The flow up to the processing (falsification prevention processing) for changing a logical volume into a WORM logical volume in this embodiment is now explained with reference to FIG. 14, FIG. 15 and FIG. 16. In this example, the flow is explained in a case when the file I/O processing unit 140 request the backup management unit 1101 to back up the logical volume shown with the virtual logical volume number 2 in the logical volume shown with the virtual logical volume number 4.

FIG. 14(A) is a diagram showing the initial state of the access management table 185 in the logical volume security configuration unit 184 of the management terminal 180. FIG. 14(B) is a diagram showing the state after the access permission attribute 403 in the access management table 185 in the logical volume security configuration unit 184 of the management terminal 180 has been changed in the falsification prevention processing.

FIG. 15(A) is a diagram showing the initial state of the logical volume management table 176 in the logical volume management unit 175 of the management terminal 170. FIG. 15(B) is a diagram showing the state after the WORM attribute 203 in the logical volume management table 176 in the logical volume management unit 175 of the management terminal 170 has been changed in the falsification prevention processing.

FIG. 16 is a diagram showing the state after an entry setting the backup destination and backup source in the backup management table 1102 in the backup management unit 1101 of the management terminal is newly created in the falsification prevention processing.

The backup management unit 1101 that received a request from the file I/O processing unit 140 accesses the logical volume management unit 175, and, from the entry 1502 of the logical volume management table 176 shown in FIG. 15(A), acquires the WORM attribute 203 of the logical volume shown with the virtual logical volume number 2 of the backup source. Since the acquired WORM attribute 203 is "Yes", the backup management unit 1101 delivers the virtual logical volume number 4 as the logical volume of the backup destination to the WORM logical volume creation unit 174, and requests the creation of the WORM logical volume.

The WORM logical volume creation unit 174 that received the request accesses the logical volume management unit 175, and, from the entry 1504 of the logical volume management table 176 shown in FIG. 15(A), recognizes that the virtual logical volume number 4 is the logical volume number 1 in the storage 130.

Next, the WORM logical volume creation unit 174 accesses the storage management unit 177 and confirms whether the security configuration flag of the storage 130 is "Yes".

Since the security configuration flag of the storage 130 is "Yes", the WORM logical volume creation unit 174 accesses the logical volume security configuration unit 184 of the storage 130 via the management interface communication processing unit 179, and, from the entries in the access management table 185 shown in FIG. 14(A), extracts the entry 1402 in which the logical volume number 401 is 1 and the I/O processing unit name 402 is other than the file I/O processing unit 150. Since the access permission attribute 403 of the extracted entry 1402 is "R/W", the WORM logical volume creation unit 174 makes an inquiry to the management terminal 180 (administrator of the storage 130 in this embodiment) as to whether the access permission attribute 403 of the entry 1402 can be set to "R".

When the administrator of the storage 130 replies "Yes" in the dialog box displayed on the management terminal 180, the WORM logical volume creation unit 174 requests the change of configuration of the access permission attribute to the logical volume security configuration unit 184 via the management interface communication processing unit 116. The logical volume security configuration unit 184, from the entries in the access management table 185 shown in FIG. 14(A), extracts the entry 1402 in which the logical volume number 401 is 1 and the I/O processing unit name 402 is other than the file I/O processing unit 150. And, as shown in the entry 1405 in the access management table 185 of FIG. 14(B), the access permission attribute 403 of the extracted entry 1402 is changed from "R/W" to "R". Further, the WORM logical volume creation unit 174 accesses the logical volume management unit 175, and, as shown in the entry 1505 in the logical volume management table 176 of FIG. 15(B), changes the WORM attribute 203 of the logical volume provided with the virtual logical volume number 4 from "No" to "Yes", and ends the processing.

Further, the backup management unit 1101 newly creates an entry 1601 in the backup management table 1102 shown in FIG. 16, combines and stores the virtual logical volume number 2 of the backup source and the virtual logical volume number 4 of the backup destination, and ends the processing.

As a result of the foregoing processing, since the logical volume of the backup destination is secured as a WORM area of the logical volume, the file I/O processing unit 140 is able to command the backup processing unit 1100 of the block I/O processing unit 150 to execute copy processing for data backup at an arbitrary timing after the falsification prevention processing.

Like this, in the third embodiment, even in cases of backing up the WORM logical volume in an externally connected storage, it is possible to prevent a computer (user terminal 110 connected to the block I/O processing unit 161 in this embodiment) connected to the externally connected storage from falsifying the backup data.

Embodiment 4

In the first embodiment, although a case is explained where a single management terminal is prepared per storage, in the fourth embodiment, explained is a case of managing a plurality of storages with a single management terminal.

The fourth embodiment is now explained with reference to FIG. 17 to FIG. 20.

Figure 17:
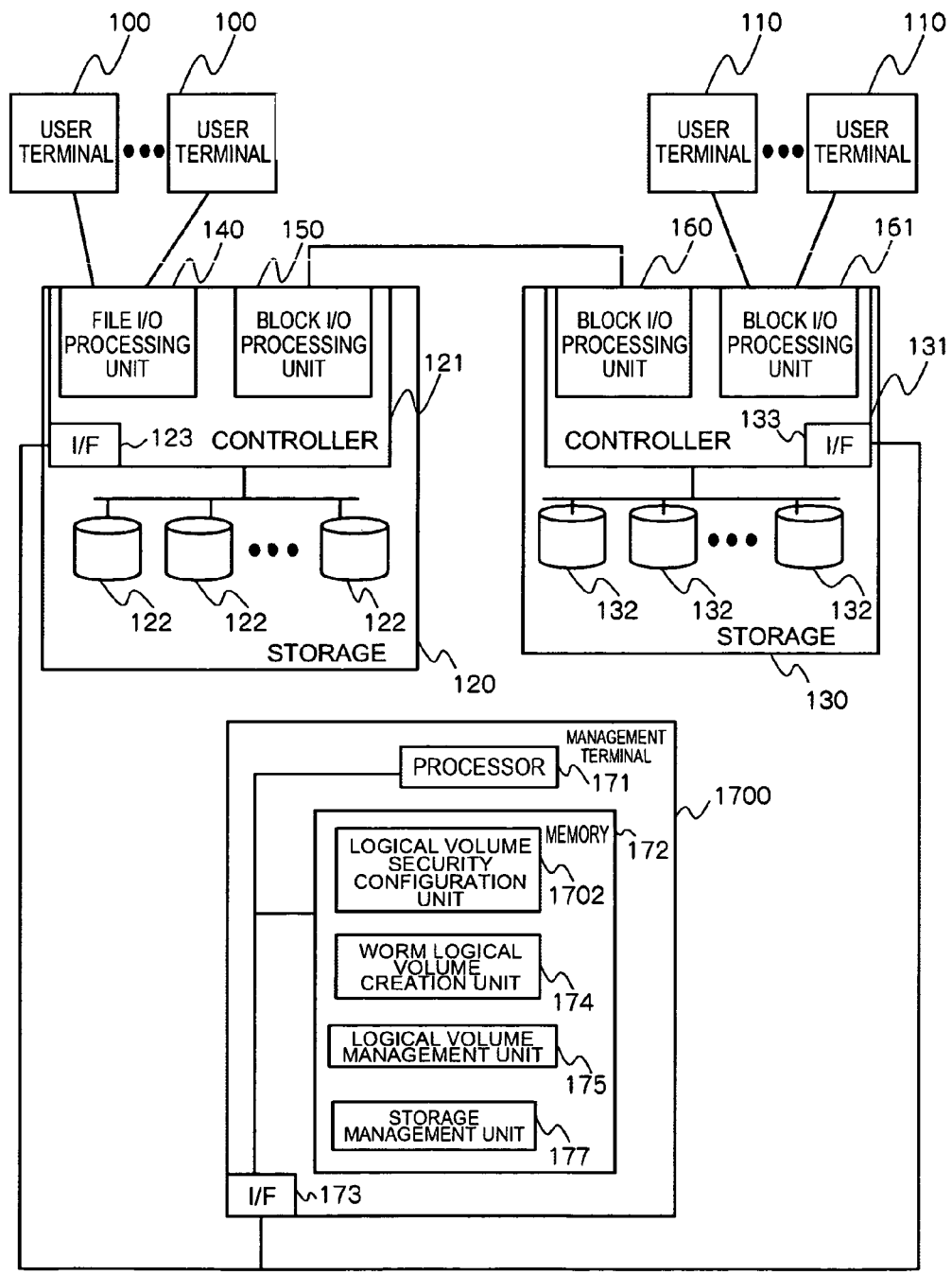
FIG. 17 is a configuration showing the system pertaining to the fourth embodiment.

FIG. 17 is a configuration showing the storage apparatus system pertaining to the fourth embodiment. The difference with FIG. 1 is explained below. The storages 120 and 130 are connected to a management terminal 1700. The management terminal 1700 has a WORM logical volume creation unit 174, a logical volume management unit 175 and a storage management unit 177 as the management units of the storage 120. It further has a logical volume security configuration unit 184 as the management unit of the storage 130.

Incidentally, in this embodiment, the management interface communication processing unit 116 is no longer required since communication will not be made between the management terminals.

Figure 18:
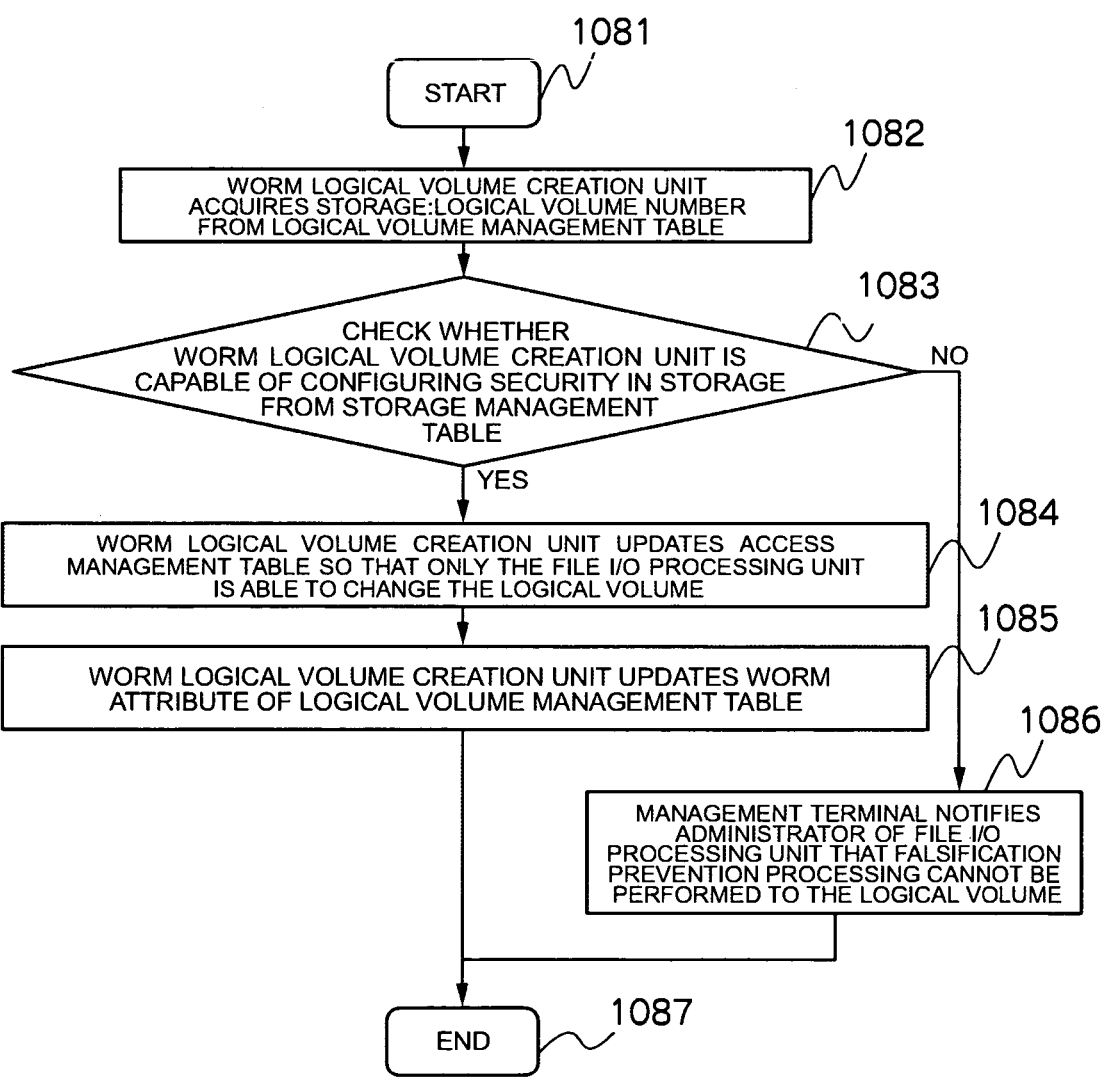
FIG. 18 is a flowchart showing the WORM logical volume creation processing pertaining to the fourth embodiment.

FIG. 18 is a flowchart showing the WORM logical volume creation processing. The WORM logical volume creation unit 174 commences the creation processing of the WORM logical volume in the external storage upon receiving a request from the file I/O processing unit 140 to change the specific logical volume into a WORM logical volume (step 1801).

When the WORM logical volume creation unit 174 is to configure a certain logical volume given a virtual logical volume number in the logical volume management table 176 as a WORM logical volume, it accesses the logical volume management unit 175 and acquires the storage name and logical volume number of the external storage in which this logical volume actually exists (step 1802).

Further, the WORM logical volume creation unit 174 accesses the storage management unit 177 and confirms whether the security configuration flag of pertinent external storage in the storage management table 178 is set to "Yes" (step 1803).

When the security configuration flag is "Yes" at step 1803, the WORM logical volume creation unit 174 accesses the logical volume security configuration unit 184, and then extracts the entry setting the pertinent logical volume number 401, and the I/O processing unit 402 in which the logical volume I/O processing unit name is other than the file I/O processing unit 140 from the entries in the access management table 185. If the access permission attribute 403 of the extracted entry is "R/W", this is changed to "R" (step 1804).

Further, the WORM logical volume creation unit 174 accesses the logical volume management unit 175, changes the WORM attribute 203 of the pertinent logical volume in the logical volume management table 176 from "No" to "Yes" (step 1805), and ends the processing (step 1807).

When the security configuration flag is "No" at step 1803, the WORM logical volume creation unit 174 notifies the file I/O processing unit 140 that falsification prevention processing cannot be performed to this logical volume (step 1806), and ends the processing.

The flow up to the processing of changing the logical volume into a WORM logical volume (falsification prevention processing) in the present embodiment is now explained with reference to FIG. 19 and FIG. 20.

FIG. 19(A) is a diagram showing the initial state of the access management table 185 in the storage security configuration unit 184 of the management terminal 1700. FIG. 19(B) is a diagram showing the state after the access permission attribute 403 in the access management table 185 in the storage security configuration unit 184 of the management terminal 1700 has been changed in the falsification prevention processing.

FIG. 20(A) is a diagram showing the initial state of the logical volume management table 176 in the logical volume management unit 175 of the management terminal 1700. FIG. 20(B) is a diagram showing the state after the WORM attribute 203 in the logical volume management table 176 in the logical volume management unit 175 of the management terminal 1700 has been changed in the falsification prevention processing.

The file I/O processing unit 140 delivers the virtual logical volume number 4 to the WORM logical volume creation unit 174 and requests the creation of the WORM logical volume.

Here, the WORM logical volume creation unit 174 that received a request accesses the logical volume management unit 175 and, from the entry 2004 of the logical volume management table 176 shown in FIG. 20(A), recognizes that the virtual logical volume number 4 is the logical volume number 1 in the storage 130.

Next, the WORM logical volume creation unit 174 accesses the storage management unit 177 and confirms whether the security configuration flag of the storage 130 is "Yes".

Since the security configuration flag of the storage 130 is "Yes", the WORM logical volume creation unit 174 accesses the logical volume security configuration unit 184, and, from the entries in the access management table 185 shown in FIG. 19(A), extracts the entry 1902 in which the logical volume number 401 is 1 and the I/O processing unit name 402 is other than the file I/O processing unit 140. And, as shown in the entry 1905 in the management table 185 of FIG. 19(B), the access permission attribute 403 of the extracted entry 1902 is changed from "R/W" to "R". Further, the WORM logical volume creation unit 174 accesses the logical volume management unit 175, and, as shown in the entry 2005 in the logical volume management table 176 of FIG. 20(B), changes the WORM attribute 203 of the logical volume provided with the virtual logical volume number 4 from "No" to "Yes", and ends the processing.

Like this, in the fourth embodiment, even in cases when a plurality of storages are to be managed with a single management terminal, when a file I/O processing unit of a certain storage is to create a WORM logical volume in an externally connected storage, it is possible to prevent a user connected to the externally connected storage from rewriting the data stored in the WORM logical volume.

Embodiment 5

In the first embodiment, although a case was explained where the program of the management terminal manages the WORM logical volume attribute, there is also an embodiment that stores this per logical volume.

The fifth embodiment is now explained with reference to FIG. 21 to FIG. 26.

Figure 21:
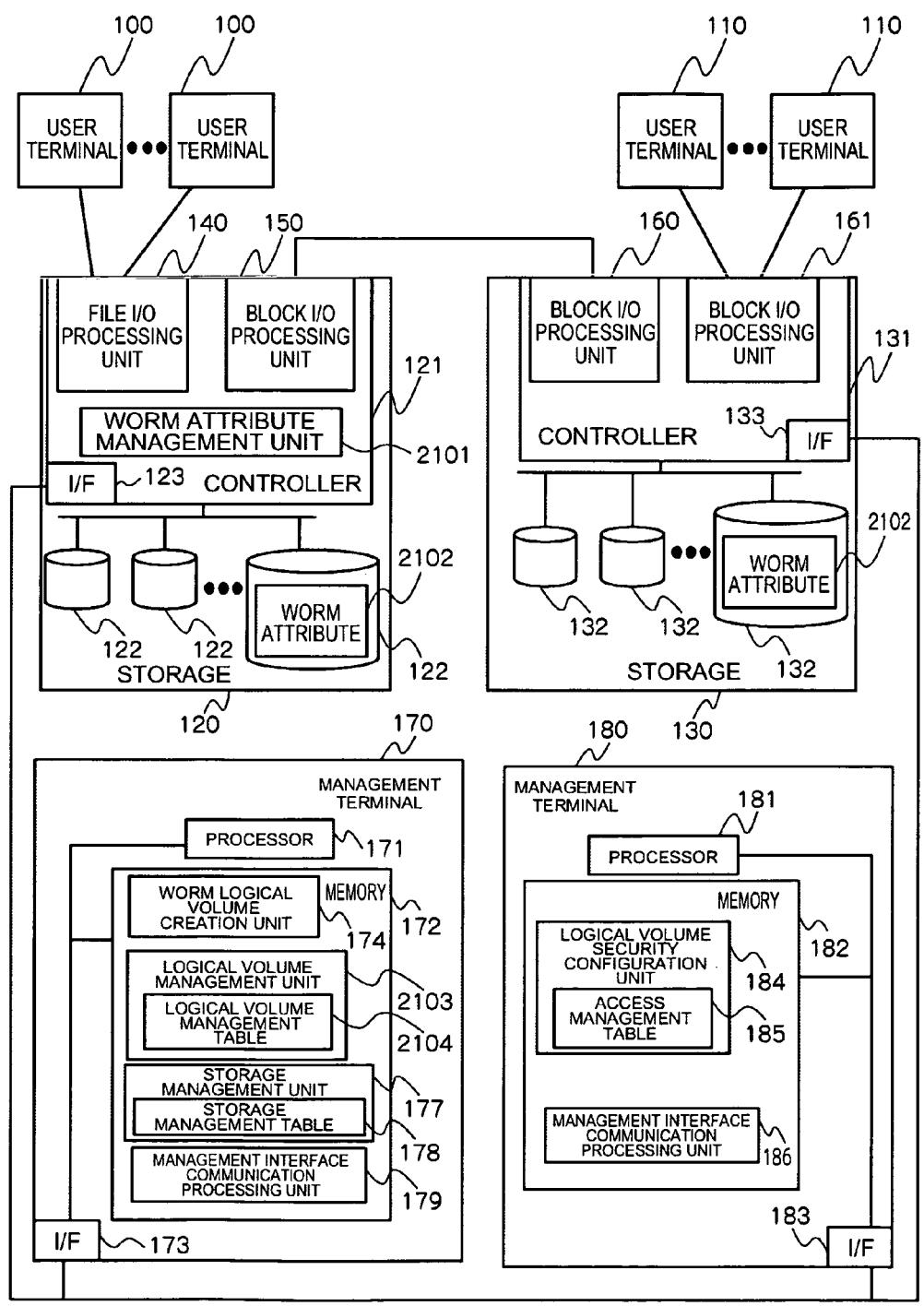
FIG. 21 is a configuration showing the system pertaining to the fifth embodiment.

FIG. 21 is a configuration showing the storage apparatus system pertaining to the fifth embodiment. The difference with FIG. 1 is explained below. The controller 121 of the storage 120 has a WORM attribute management unit 2101. The WORM attribute management unit 2101 adds a WORM attribute 2102 for showing whether it is a WORM to the respective logical volumes in the storage 120 and the logical volume provided from the storage 130. The respective logical volumes, for instance, have a WORM attribute management table, and retain the WORM attribute 2102 added to the logical volume as described above.

The logical volume management unit 2103 in the management terminal 170 has the role of virtually presenting the logical volume of the storage 120 and the logical volume provided from the external storage to the I/O processing unit of the storage with the virtual logical volume number. Incidentally, the logical volume management unit 2103 does not have the role of managing whether each of the respective logical volumes is a WORM logical volume. The logical volume management unit 2103 has a logical volume management table 2104 for combining and retaining the virtual logical volume number, a storage actually existing and a logical volume number of such storage.

FIG. 22 is a configuration of the WORM attribute management table showing the WORM attribute stored in the respective logical volumes.

The logical volume has a plurality of entries 2210 to 2213 setting a data block number 2201, and a WORM attribute 2202 per data block. The data block number 2201 stores a number for separating the data unit as the overall data area of the logical volume and uniquely identifying such separated data. The data unit, in addition to the block used in this embodiment, for example, may also be a physical unit such as a disk apparatus or a disk sector, or a logical unit such as a volume or a file.

The WORM attribute 2202 stores information as a flag for identifying whether the data shown with the data block number 2201 is a WORM area that does not permit falsification. As a result of this flag, the storage 120 is able to identify which data block in the logical volume is a WORM area, and provide this to the user terminal.

For instance, information stored in the entry 2210 represents that the data block provided with the data block number 1 is not a WORM area. Further, information stored in the entry 2211 represents that the data block provided with the data block number 2 is a WORM area.

FIG. 23 is a configuration showing an example of the logical volume management table 2104. The logical volume management table 2104 has a plurality of entries 2310 to 2313 setting a virtual logical volume number 2301, and a storage name and storage logical volume number 2302 in which the logical volume actually exists.

The virtual logical volume number 2301 stores an identifier for uniquely-identifying the logical volume in the storage, and the logical volume in the externally connected storage.

The storage name and storage logical volume number 2302 stores identifying information of the storage in which the logical volume shown with the virtual logical volume number 2301 actually exists, and identifying information of the logical volume shown with the logical volume number 2301 in the storage. In this embodiment, the storage name and logical volume number are respectively stored therein.

For example, information stored in the entry 2311 represents that the logical volume provided with the virtual logical volume number 2 is actually a logical volume provided with the logical volume number 2 of the storage 120. Further, information stored in the entry 2313 represents that the logical volume provided with the virtual logical volume number 4 is actually a logical volume provided with the logical volume number 1 of the storage 130.

Figure 24:
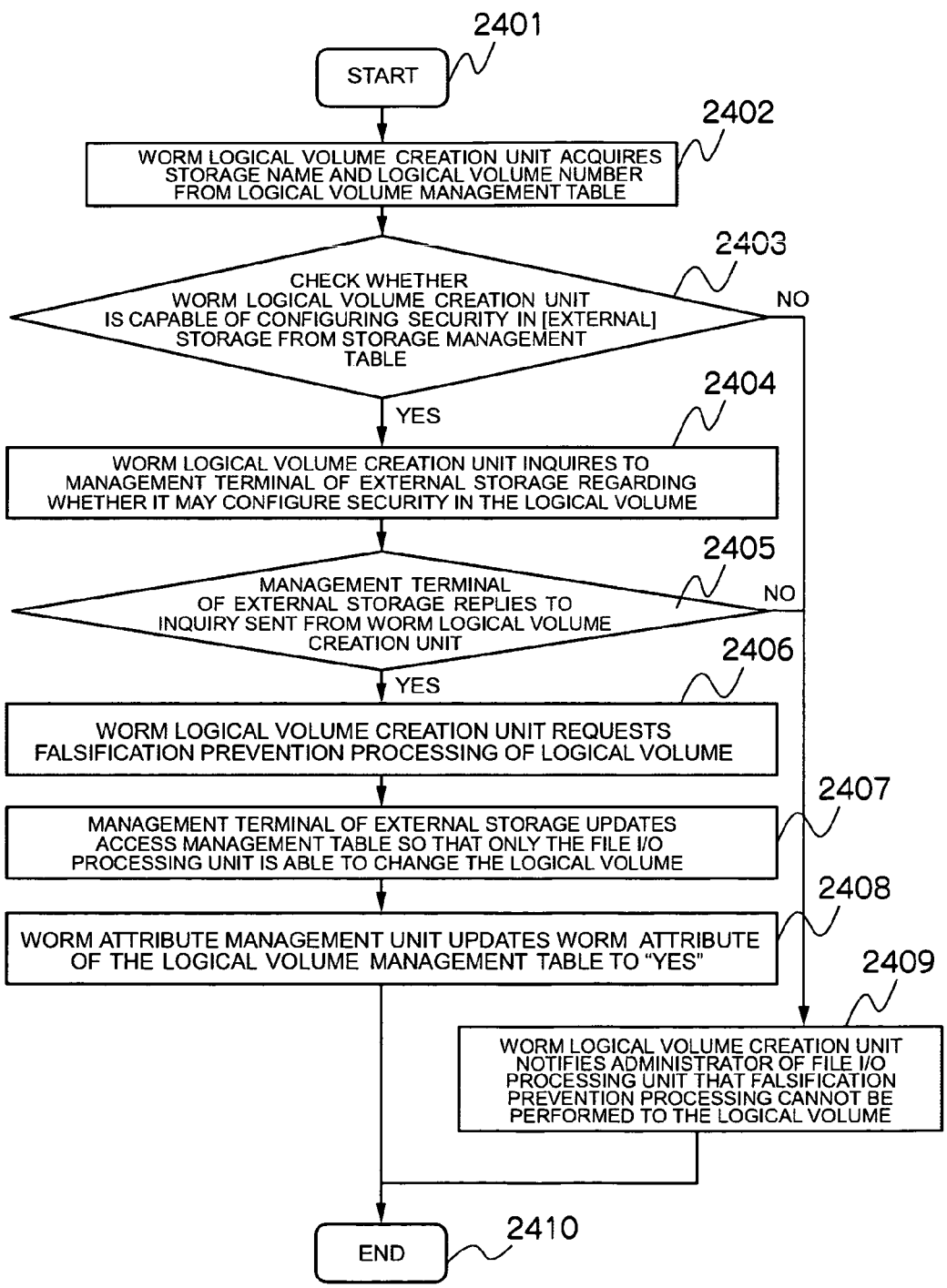
FIG. 24 is a flowchart showing the WORM logical volume creation processing pertaining to the fifth embodiment.

FIG. 24 is a flowchart showing the WORM logical volume creation processing pertaining to the fifth embodiment. The WORM logical volume creation unit 174 commences the creation processing of the WORM logical volume in the external storage upon receiving a request from the file I/O processing unit 140 to configure the specific logical volume as the WORM logical volume (step 2401).

When the WORM logical volume creation unit 174 is to configure a certain logical volume given a virtual logical volume number in the logical volume management table 2104 as a WORM logical volume, it accesses the logical volume management unit 2103 in the management terminal 170 and acquires the storage name and logical volume number of the external storage in which this logical volume actually exists (step 2402).

Further, the WORM logical volume creation unit 174 accesses the storage management unit 177 and confirms whether the security configuration flag of the pertinent external storage in the storage management table 178 is set to "Yes" (step 2403).

When the security configuration flag is "Yes" at step 2403, the WORM logical volume creation unit 174 accesses the logical volume security configuration unit 184 of the pertinent external storage via the management interface communication processing unit 179. And, the WORM logical volume creation unit 174, from the entries in the access management table 185, extracts the setting of the logical volume number 401 of the pertinent logical volume and the I/O processing unit name in which the I/O processing unit is other than the file I/O processing unit 140. If the access permission attribute of the extracted entry is "R/W", the WORM logical volume creation unit 2101 makes an inquiry to the logical volume security configuration unit 184 on whether this can be set as "R" (step 2404).

The management terminal of the external storage that received the inquiry (in the foregoing example, administrator of the external storage) replies to this inquiry (step 2405).

When the reply to the inquiry is "Yes" at step 2405, the WORM logical volume creation unit 174 requests the change of configuration to the logical volume security configuration unit 184 via the management interface communication processing unit 116 (step 2406).

The logical volume security configuration unit 184, from the entries in the access management table 185, extracts an entry setting the logical volume number 401 of the pertinent logical volume and the I/O processing unit name 402 in which the I/O processing unit is other than the file I/O processing unit 140. And, if the access permission attribute 403 of the extracted entry is "R/W", this is set to "R" (step 2407).

Further, the WORM logical volume creation unit 174 commands the WORM attribute management unit 2101 in the controller 121 to change the WORM attribute, and the WORM attribute management unit 2101 changes the WORM attribute 2202 corresponding to the data block number 2201 in the WORM attribute management table to "Yes" (step 2408), and ends the processing (step 2410).

When the security configuration flag of this storage is "No" at step 2403 or when the reply from the management terminal of this storage is "NO" at step 2405, the file I/O processing unit 140 is notified that the falsification prevention processing to this logical volume cannot be performed (step 2409), and the processing is thereafter ended (step 2410). The flow up to performing the processing (falsification prevention processing) for changing the logical volume to a WORM logical volume in this embodiment is now explained with reference to FIG. 25 and FIG. 26. In this example, the flow is explained in a case when the file I/O processing unit 140 requests the WORM logical volume creation unit 174 to change the logical volume provided with the virtual logical volume number 4 into a WORM logical volume.

FIG. 25(A) is a diagram showing the initial state of the access management table 185 in the logical volume security configuration unit 184 of the management terminal 180. FIG. 25(B) is a diagram showing the state after the access permission attribute 403 in the access management table 185 in the logical volume security configuration unit 184 of the management terminal 180 has been changed in the falsification prevention processing.

Figure 26:
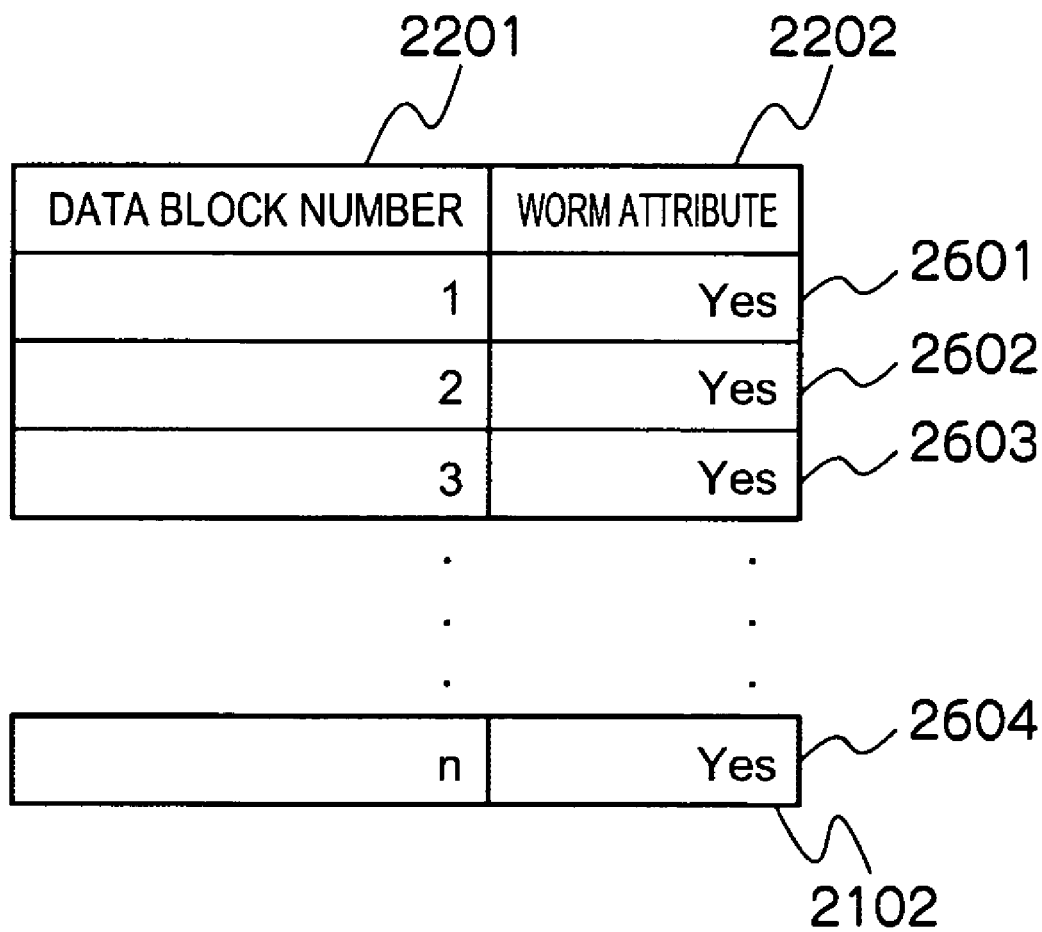
FIG. 26 is a configuration showing the WORM attribute after the falsification prevention processing pertaining to the fifth embodiment.

FIG. 26 is a diagram showing the state of the WORM attribute management table after the WORM attribute 2202 regarding data in the logical volume represented as logical volume number 1 of the storage 130 has been changed in the falsification prevention processing.

The WORM logical volume creation unit 174 that received a request from the file I/O processing unit 140 accesses the logical volume management unit 2103 and, from the entry 2313 of the logical volume management table 2104 shown in FIG. 23, recognizes that the virtual logical volume number 4 is the logical volume number 1 in the storage 130.

Next, the WORM logical volume creation unit 174 accesses the storage management unit 177 confirms whether the security configuration flag of the storage 130 is "Yes";.

Since the security configuration flag of the storage 130 is "Yes", the WORM logical volume creation unit 174 accesses the logical volume security configuration unit 184 of the storage 130 via the management interface communication processing unit 116, and, from the entry in the access management table 185 shown in FIG. 25(A), extracts the entry 2502 in which the logical volume number 401 is 1 and the I/O processing unit name 402 is other than the file I/O processing unit 140. Since the access permission attribute 403 of the extracted entry is "R/W", it makes and inquiry as to whether this can be set as "R".

When the administrator of the storage 130 answers "Yes" to in the dialog box displayed on the management terminal 180, the WORM logical volume creation unit 174 requests the change of configuration to the logical volume security configuration unit 184 via the management interface communication processing unit 179. The logical volume security configuration unit 184, from the entries in the access management table 185 shown in FIG. 25(A), extracts the entry 2502 in which the logical volume number 401 is 1 and the I/O processing unit name 402 is other than the file I/O processing unit 140. And, as shown with the entry 2505 in the access management table 185 of the FIG. 25(B), the access permission attribute 403 of the extracted entry is changed from "R/W" to "R".

Further, the WORM logical volume creation unit 174 commands the WORM attribute management unit 2101 in the controller of the storage 120 to change the WORM attribute. The WORM attribute management unit 2101 that received such command, as shown with entries 2601 to 2604 in FIG. 26, changes the WORM attribute 2202 corresponding to the data block number 2201 regarding all data in this logical volume to "Yes", and then ends the processing.

As described above, in the fifth embodiment, even in cases where the respective logical volumes are to retain the WORM attribute in the in units of a certain data regarding the respective data in the logical volume, it is possible to prevent the falsification to the WORM logical volume from a user connected to an externally connected storage.

Incidentally, in the fifth embodiment, the configuration may also be such that the logical volume has a metadata unit for storing metadata, and a data block unit for storing data of each certain data unit, and the WORM attribute of each certain data unit may be stored in the metadata unit.

MODIFIED EXAMPLE 1

In the first to fifth embodiments, explained was a case where the file I/O processing unit commanded the management terminal to conduct the configuration of WORM to the logical volume in the external storage used by the user terminal. Here, the file I/O unit is a file server to be connected to the storage, and the user terminal may also use the storage area in the storage via this file server. In this case, the file server commands the management terminal to conduct the configuration of WORM to the logical volume in the external storage used by the user terminal.

Figure 27:
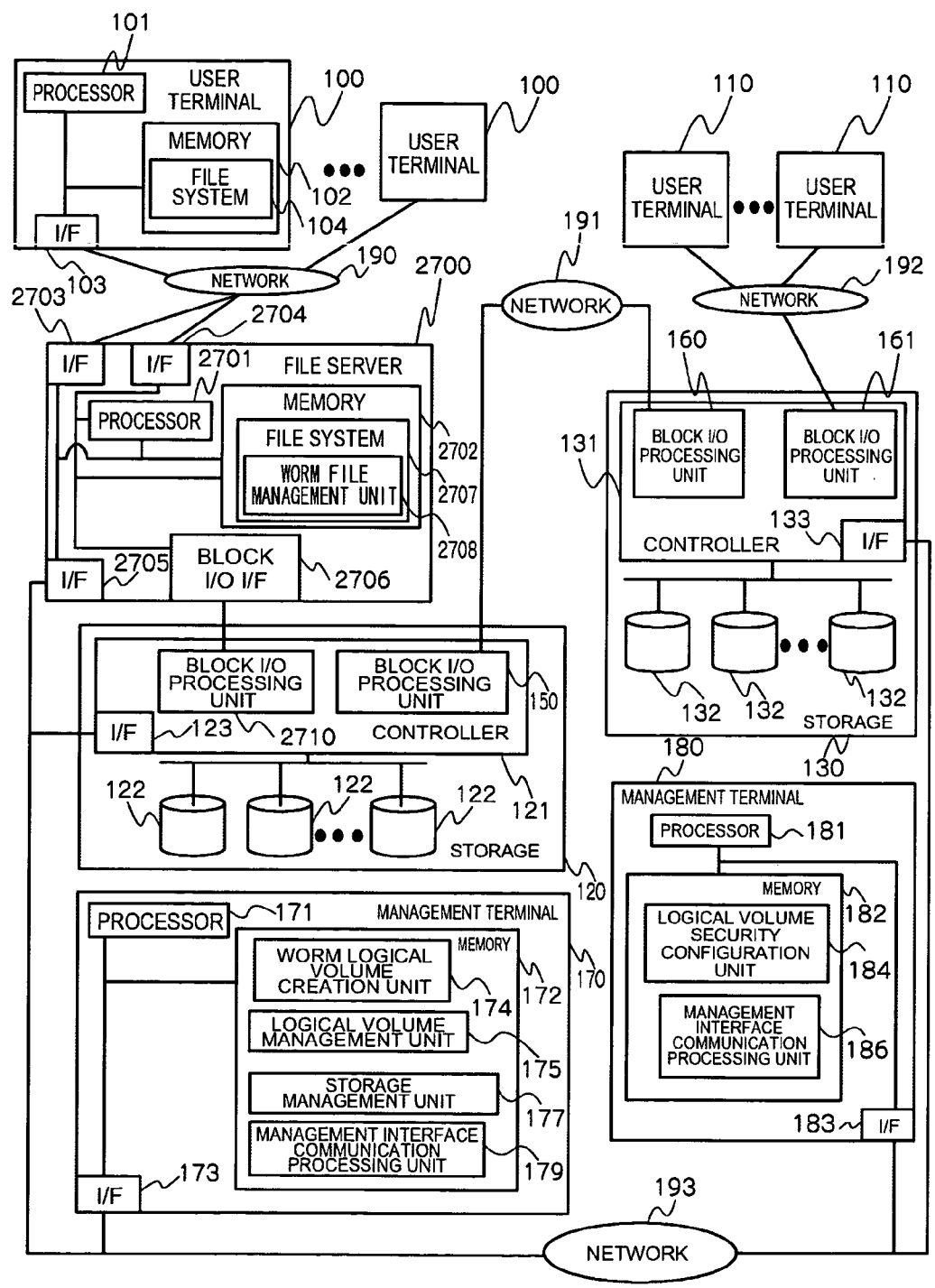
FIG. 27 is a configuration showing the system pertaining to a modified example of the embodiments.

The system configuration including the file server is now explained with reference to FIG. 27. The difference with FIG. 1 is explained below. The plurality of user terminals 100 are connected to a file server 2700 via the network 190, and the file server 2700 is interconnected with a block I/O unit 2710 in the storage 120. The block I/O processing unit 2710 is configured the same as the foregoing block I/O processing units 150, 160, 161.

The file server 2700 has the role of receiving a file operation request from a user, storing data in file units in the logical volume in the storage 120, and extracting such data. The file server 2700 is configured from a processor 2701, a memory 2702, an I/F 2703, an I/F 2704, an I/F 2705, and a block I/O I/F 2706. The processor 2701 reads a program into the memory 2702 arid executes such program, and communicates with another apparatus via the I/Fs 2703, 2704, 2705 and block I/O I/F 2706. As a program to be read into the memory 2702 and executed by the processor 2701, for example, a file system 2707, and a WORM file management unit 2708 to be executed by the file system 2707 may be used.

Incidentally, the file system 2707 is a file system having compatibility with the file system of the user terminal 100 for transmitting and receiving data in file units between the user terminal 100 and storage 120.

The processor 2701 transmits and receives control information such as a file operation request to and from the user terminal 100 via the network 190 connected to the I/F 2703, and transmits and receives control information to and from the management terminal 170 via the management network 193 connected to the I/F 2705. Further, the processor 2701 transmits and receives data to and from the user terminal via the network 190 connected to the I/F 2704, accesses the block I/O processing unit 2710 of the storage 120 via the block I/O I/F 2706, and operates the data stored in the storage medium 122.

In the system configuration described above, the creation processing of the WORM logical volume which was conducted with the file I/O processing unit 140 in the first embodiment can be executed with the file server 2710.

Incidentally, although five embodiments and a modified example were explained above, the present invention shall not in any way be limited by these embodiments.

What is claimed is:

1. A computer system comprising:
a first storage system;
a second storage system connected to said first storage system;
a first storage area which is a plurality of storage areas in said first storage system; and
a second storage area which is a plurality of storage areas in said second storage system,
wherein said first storage system comprises:
a controller unit for providing said second storage area as a storage area of said first storage system to a first computer connected to said first storage system;
and an access control command unit for commanding said second storage system to restrict the access to a prescribed storage area in said second storage area from a second computer connected to said second storage system, and
wherein said second storage system comprises:
an access control configuration unit for restricting the access to said prescribed storage area in said second storage area from said second computer based on a command of said access control received from said access control command unit of said first storage system,
wherein said controller unit comprises:
a first I/O processing unit for controlling an I/O request to said first storage area from said first computer; and
a second I/O processing unit for providing said second storage area as a storage area of said first storage system to said first computer via said first I/O processing unit, and for controlling an I/O wherein said controller unit comprises:
a first I/O processing unit for controlling an I/O request to said first storage area from said first computer; and
a second I/O processing unit for providing said second storage area as a storage area of said first storage system to said first computer via said first I/O processing unit, and for controlling an I/O request to said second storage area via said first I/O processing unit, and
wherein said access control configuration unit prohibits a write request from said second computer to data stored in said prescribed storage area in said second storage area based on a command of said access control received from said access control command unit of said first storage systemequest to said second storage area via said first I/O processing unit, and wherein said access control configuration unit prohibits a write request from said second computer to data stored in said prescribed storage area in said second storage area based on a command of said access control received from said access control command unit of said first storage system.

2. The computer system according to claim 1, wherein said second storage system further comprises:
a third I/O processing unit for controlling an I/O request to any storage area in said second storage area based on an I/O request transmitted from said second I/O processing unit; and
a fourth I/O processing unit for controlling an I/O request to said second storage area from said second computer.

3. The computer system according to claim 2,
wherein said second storage system further comprises:
a configuration table storing information for identifying the accessibility of a read request or write request to said second storage area, and
wherein, when said access control configuration unit is to realize a configuration of prohibiting a write request from said second computer to data stored in said prescribed storage area based on a command of said access control received from said creation unit, said access control configuration unit updates said configuration table so as to prohibit the write request from said fourth I/O processing unit.

4. The computer system according to claim 3,
wherein when said second computer transmits a read request to data stored in said prescribed storage area in said second storage area via said fourth I/O processing unit, said second storage system refers to said configuration table and permits said read request, and
wherein when said second computer connected to said second storage system transmits a write request to data stored in said prescribed storage area in said second storage area via said fourth I/O processing unit, said second storage system refers to said configuration table and prohibits said write request.

5. The computer system according to claim 3,
wherein said first storage system includes a management table for associating an identifier for uniquely identifying said first storage area and said second storage area to be provided to said first storage system, and an access control attribute for prohibiting the write request to data stored in said storage area from said first or second computer, and
wherein, when said access control configuration unit is to update said configuration table regarding said prescribed storage area in said second storage area based on a command of said access control received from said access control command unit, said access control command unit updates said management table so as to provide said access control attribute to said prescribed storage area in accordance with the update of said configuration table.

6. The computer system according to claim 1,
wherein said first storage system includes a replication management unit for requesting the creation of a replicated storage area in said second storage system as a replication of a certain storage area in said first storage area in said first storage system, wherein said replication management unit determines whether access control for prohibiting the write request is configured in said access control performed by said access control configuration unit to a storage area of said replication source, and requests said second storage system to create said replicated storage area when said access control is configured, wherein said second storage system creates said replicated storage area in said second storage system based on said creation request, wherein said access control configuration unit configures said access control so as to prohibit the write request to said replicated storage area of the created replication destination from said second computer, wherein said access control command unit provides and manages an identifier showing that said access control has been configured to said replicated storage area to which said access control has been configured, and wherein said replication management unit associates and manages the storage area of said replication source and said replicated storage area of said replication destination.

7. The computer system according to claim 6,
wherein said second I/O processing unit includes a replication processing unit for replicating data, which is contained in a storage area of said replication source in said first storage system, in said replicated storage area in said second storage system, and
wherein said replication processing unit refers to said replicated storage area of said replication destination corresponding to a storage area of said replication source managed by said replication management unit, and replicates data, which is contained in a storage area of said replication source, in said replicated storage area of said replication destination.

8. The computer system according to claim 1,
wherein said first storage system further comprises:
a storage management unit for making an inquiry to said second storage on whether it is possible to change the access authority to said plurality of storage areas in said second storage area,
wherein said storage management unit makes an inquiry to said second storage system on whether it is possible to change the access authority to said prescribed storage area, and transmits information to said access control command unit indicating that said access authority can be changed, and
wherein said access control command unit transmits to said second storage system access control for controlling the access to said prescribed storage area from said second computer based on information indicating that said access authority can be changed.

9. The computer system according to claim 1,
wherein said first storage system and said second storage system transmit and receive data via a SAN (storage area network), and
wherein said first storage system and said second storage system transmit and receive control information via a LAN (local area network).

10. The computer system according to claim 1, wherein said first computer and said first storage system are connected via a LAN (local area network), and said second computer and said second storage system are connected via a LAN.

11. A computer system comprising:
a plurality of Storage systems respectively connected to a computer, wherein said plurality of storage system respectively comprise:

a plurality of storage areas storing data to be used by said computer connected to said storage system;

an I/O processing unit for providing to said computer said plurality of storage areas in another storage system connected to said storage system as a storage area of said storage system, and controlling an I/O request from said computer to said plurality of storage areas in said storage system;

a storage management unit for making an inquiry to another storage system on whether it is possible to change the access authority to said plurality of storage areas in said other storage system to be connected to said storage system;

an access control command unit for commanding said other storage system to restrict the access to a prescribed storage area among said plurality of storage areas in said other storage system from another computer connected to said other storage system upon receiving information indicating that it is possible to change the access authority to a storage area in said other storage system from said storage management unit;

a management table in which said prescribed storage area and the access control attribute for prohibiting a write request to data stored in said prescribed storage area from said other computer are associated with said access control command unit when said other storage system configures access control from said other computer to said prescribed storage area in said other storage system based on an access control command of said storage system;

an access control configuration unit for realizing a configuration of restricting the access from said computer to a certain storage area in said storage system when said access control command unit in said other storage system commands said storage system to perform access control from said computer to said certain storage area provided by said storage system to said other storage; and a configuration table in which said computer and information showing the accessibility to said certain storage area are associated by said access control configuration unit.

12. A computer system comprising:

a first storage system;

a second storage system connected to said first storage system;

a management terminal connected to said first and second storage systems; and a first storage area which is a plurality of storage areas in said first storage system and a second storage area which is a plurality of storage areas in said second storage system, wherein said first storage system comprises:

a controller unit for providing said second storage area as a storage area of said first storage system to a first computer connected to said first storage system, wherein said management terminal comprises;

a storage management unit for determining whether it is possible to change the access authority to said second storage area;

an access control command unit for commanding the restriction of access to a prescribed storage area in said second storage area from a second computer connected to said second storage system based on information received from said storage management unit indicating that it is possible to change the access authority to said second storage area;

an access control configuration unit for configuring access control from said second computer to said prescribed storage area in said second storage area based on said access control command;

a configuration table in which said second computer and information showing the accessibility to said prescribed storage area are associated by said access control configuration unit; and a management table in which said access control command unit associates and manages said prescribed storage area and an access control attribute for prohibiting a write request to data stored in said prescribed storage area from said second computer based on the update of said configuration table.

13. A computer system comprising;

a first storage system a second storage system;

a first storage area which is a plurality of storage areas in said first storage system; and a second storage area which is a plurality of storage areas in said second storage system, wherein said first storage system comprises:

a first I/O processing unit for controlling an I/O request to said first storage area from said first computer;

a second I/O processing unit for providing said second storage area as a storage area of said first storage system to said first computer via said first I/O processing unit, and for controlling an I/O request to said second storage area via said first I/O processing unit;

an attribute management unit for granting and managing an access control attribute per said prescribed unit data stored in said first and second storage areas; and an access control command unit for commanding said second storage system to restrict the access to a prescribed storage area in said second storage area from a second computer connected to said second storage system, wherein said second storage system comprises:

access control configuration unit prohibits a write request from said second computer to data stored in said prescribed storage area in said second storage area based on a command received from said access control command, and wherein said attribute management unit provides said access control attribute respectively to said prescribed unit data stored in said prescribed storage area configured by said access control configuration unit to prohibit a write request.

14. The computer system according to claim 13, wherein said second storage system further comprises:

a third I/O processing unit for controlling an I/O request to any storage area in said second storage area based on an I/O request transmitted from said second I/O processing unit; and a fourth I/O processing unit for controlling an VO request to said second storage area from said second computer.

15. The computer system according to claim 14, wherein said second storage system further comprises;

a configuration table storing information for identifying the accessibility of a read request or write request to said second storage area, and wherein, when said access control configuration unit is to realize a configuration of prohibiting a write request from said second computer to data stored in said prescribed storage area based on a command of said access control received from said creation unit, said access control configuration unit updates said configuration table so as to prohibit the write request from said fourth I/O processing unit.

16. A computer system comprising;
a computer;
a first storage system connected to said computer;
a second storage system connected to said first storage system;
a first storage area which is a plurality of storage areas in said first storage system; and
a second storage area which is a plurality of storage areas in said second storage system,
wherein said computer includes a conversion unit for converting an I/O request to a file form data in said storage area from a first computer which uses said first storage area via said computer, into an I/O request to a block form data,
wherein said first storage system comprises;
a first I/O processing unit for controlling an I/O request to said block form data converted by said computer for said first storage area;
a second I/O processing unit for controlling an I/O request to said block form data converted by said computer for said second storage area to be provided to said computer via said first storage system; and
an access control command unit for commanding said second storage system to restrict the access to a prescribed storage area in said second storage area from a second computer connected to said second storage system, and
wherein said second storage system comprises:
an access control configuration unit for restricting the access to said prescribed storage area in second storage system from said second computer based on a command received from said access control command unit.

17. The computer system according to claim 16, wherein said second storage system further comprises:
a third I/O processing unit for controlling an I/O request to any storage area in said second storage area based on an I/O request transmitted from said second I/O processing unit; and
a fourth I/O processing unit for controlling an I/O request to said second storage area from said second computer.

18. The computer system according to claim 17,
wherein said second storage system further comprises:
a configuration table storing information for identifying the accessibility of a read request or write request to said second storage area, and
wherein, when said access control configuration unit is to realize a configuration of prohibiting a write request from said second computer to data stored in said prescribed storage area based on a command of said access control received from said creation unit, said access control configuration unit updates said configuration table so as to prohibit the write request from said fourth I/O processing unit.

* * * * *